United States Patent
Zhang et al.

(10) Patent No.: US 12,393,321 B2
(45) Date of Patent: *Aug. 19, 2025

(54) DISPLAY METHOD, APPARATUS, DEVICE AND STORAGE MEDIUM

(71) Applicant: Beijing Bytedance Network Technology Co., Ltd., Beijing (CN)

(72) Inventors: Ao Zhang, Beijing (CN); Ji Liu, Beijing (CN); Shun Liu, Beijing (CN); Shengyan Shi, Beijing (CN); Shuhan Xu, Beijing (CN); Ruihan Wang, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/004,641

(22) PCT Filed: Jul. 2, 2021

(86) PCT No.: PCT/CN2021/104343
§ 371 (c)(1),
(2) Date: Jan. 6, 2023

(87) PCT Pub. No.: WO2022/007722
PCT Pub. Date: Jan. 13, 2022

(65) Prior Publication Data
US 2023/0244362 A1    Aug. 3, 2023

(30) Foreign Application Priority Data
Jul. 6, 2020    (CN) .................. 202010642206.X

(51) Int. Cl.
*G06F 3/0484*    (2022.01)
*G06F 3/0481*    (2022.01)
(Continued)

(52) U.S. Cl.
CPC .......... *G06F 3/0484* (2013.01); *G06F 3/0481* (2013.01); *G06F 16/74* (2019.01); *G06F 3/0488* (2013.01); *G06F 2203/04803* (2013.01)

(58) Field of Classification Search
CPC .................................................. G06F 3/0484
See application file for complete search history.

(56) References Cited

U.S. PATENT DOCUMENTS

| 11,645,249 B1 | 5/2023 | Mahyar et al. |
| 2009/0089712 A1 | 4/2009 | Sato |

(Continued)

FOREIGN PATENT DOCUMENTS

| CN | 102625155 A | 8/2012 |
| CN | 104185073 A | 12/2014 |

(Continued)

OTHER PUBLICATIONS

China National Intellectual Property Administration, Office Action Issued in Application No. 202010642206.X, Sep. 24, 2021, 17 pages.

(Continued)

*Primary Examiner* — James J Debrow
(74) *Attorney, Agent, or Firm* — Alleman Hall & Tuttle LLP

(57) ABSTRACT

A display method, apparatus, device and storage medium, the method includes: displaying a user interface for playing a target video (S101), where the user interface includes an image display area, and the target video includes multiple target sub-videos; playing each target sub-video in the target video sequentially on the user interface while displaying multiple images in the image display area (S102), where the multiple target sub-videos respectively correspond to the multiple images displayed in the image display area; and in response to a first triggering operation acting on a target (Continued)

image in the image display area, jumping to and displaying target information associated with the target image (S103), where the target image includes any image displayed in the image display area. The method can provide users with convenient operations to realize multi-functionalization, thereby meeting their needs and enhancing their operational experience.

17 Claims, 12 Drawing Sheets

(51) Int. Cl.
*G06F 16/74* (2019.01)
*G06F 3/0488* (2022.01)

(56) References Cited

U.S. PATENT DOCUMENTS

| | | | | |
|---|---|---|---|---|
| 2010/0153831 | A1* | 6/2010 | Beaton | G06F 17/00 |
| 2010/0262911 | A1* | 10/2010 | Kaplan et al. | G06F 3/00 |
| 2012/0272278 | A1 | 10/2012 | Bedi | |
| 2016/0337609 | A1* | 11/2016 | Zhou | H04N 5/44591 |
| 2018/0246625 | A1 | 8/2018 | Luo | |
| 2020/0321029 | A1* | 10/2020 | Cui et al. | G11B 27/031 |
| 2022/0353567 | A1 | 11/2022 | Greene | |
| 2023/0300403 | A1* | 9/2023 | Li et al. | H04N 21/4316 |

FOREIGN PATENT DOCUMENTS

| | | |
|---|---|---|
| CN | 104202658 A | 12/2014 |
| CN | 104703014 A | 6/2015 |
| CN | 105472428 A | 4/2016 |
| CN | 105488145 A | 4/2016 |
| CN | 106375826 A | 2/2017 |
| CN | 109391856 A | 2/2019 |
| CN | 109918068 A | 6/2019 |
| CN | 111147913 A | 5/2020 |
| CN | 111246301 A | 6/2020 |
| CN | 111753132 A | 10/2020 |
| CN | 111930996 A | 11/2020 |

OTHER PUBLICATIONS

China National Intellectual Property Administration, Office Action Issued in Application No. 202010642206.X, Dec. 21, 2021, 17 pages.
ISA China National Intellectual Property Administration, International Search Report Issued in Application No. PCT/CN2021/104343, Sep. 23, 2021, WIPO, 17 pages.
China National Intellectual Property Administration, Notice of Rejection Issued in Application No. 202010642206.X, Apr. 20, 2022, 5 pages.
China National Intellectual Property Administration, Office Action and Search Report Issued in Application No. 202010642222.9, Mar. 11, 2022, 21 pages.
China National Intellectual Property Administration, Office Action and Search Report Issued in Application No. 202010642222.9, Sep. 3, 2021, 21 pages.
China National Intellectual Property Administration, Office Action and Search Report Issued in Application No. 202010642222.9, Dec. 7, 2021, 21 pages.
ISA China National Intellectual Property Administration, International Search Report Issued in Application No. PCT/CN2021/104368, Sep. 30, 2021, WIPO, 12 pages.
United States Patent and Trademark Office, Office Action Issued in U.S. Appl. No. 18/004,441, filed Mar. 6, 2024, 21 pages.
United States Patent and Trademark Office, Office Action Issued in U.S. Appl. No. 18/004,441, filed Jul. 12, 2024, 21 pages.

* cited by examiner

DISPLAY METHOD, APPARATUS, DEVICE AND STORAGE MEDIUM

CROSS-REFERENCE TO RELATED APPLICATIONS

This disclosure is a national stage of International Application No. PCT/CN2021/104343, filed on Jul. 2, 2021, which claims priority to Chinese Patent Application No. 202010642206.X, filed on Jul. 6, 2020, both of which are hereby incorporated by reference in their entireties.

TECHNICAL FIELD

Embodiments of the present disclosure relates to the field of computer technology, and in particular to a display method, apparatus, electronic device, and storage medium.

BACKGROUND

The video playing function is a common function of the client's video player or video playing application. With the development of science and technology, the application of the video playing function is becoming more and more widely used.

However, current video playing applications or video players can only provide users with a single video in a playing interface, without providing other information, and meanwhile fail to provide users with convenient and rich functions, thereby affecting the user experience.

SUMMARY

Embodiments of the present disclosure provide a display method, apparatus, device, and storage medium, which provide users with convenient operations and realize multi-functionalization, thereby meeting their needs and enhancing their operational experience.

In a first aspect, embodiments of the present disclosure provide a display method, including:
   displaying a user interface for playing a target video, where the user interface includes an image display area, and the target video includes multiple target sub-videos;
   playing each of the target sub-videos in the target video sequentially on the user interface while displaying multiple images in the image display area, where the multiple target sub-videos respectively correspond to the multiple images displayed in the image display area;
   in response to a first triggering operation acting on a target image in the image display area, jumping to and displaying target information associated with the target image, where the target image includes any one of the images displayed in the image display area.

In a second aspect, embodiments of the present disclosure provide a display apparatus, including:
   a displaying module, configured to display a user interface for playing a target video, where the user interface includes an image display area, and the target video includes multiple target sub-videos;
   a playing module, configured to play each of the target sub-videos in the target video sequentially on the user interface while displaying multiple images in the image display area, where the multiple target sub-videos respectively correspond to the multiple images displayed in the image display area; and
   a processing module, configured to in response to a first triggering operation acting on a target image in the image display area, jump to and display target information associated with the target image, where the target image includes any one of the images displayed in the image display area.

In a third aspect, embodiments of the present disclosure provide an electronic device, including: at least one processor and a memory;
   the memory stores computer-executable instructions;
   the at least one processor executes the computer-executable instructions stored in the memory such that the at least one processor executes the display method according to any item of the first aspect.

In a fourth aspect, embodiments of the present disclosure provide a computer-readable storage medium, the computer-readable storage medium stores computer-executable instructions which, when executed by a processor, implement the display method according to any item of the first aspect.

In a fifth aspect, embodiments of the present disclosure provide a computer program product, including a computer program, which, when executed by a processing apparatus, implements the steps of the method according to the first aspect of the present disclosure.

In a sixth aspect, embodiments of the present disclosure provide a computer program, which, when executed by a processing apparatus, implements the steps of the method according to the first aspect of the present disclosure.

Embodiments of the present disclosure provide a display method, apparatus, device, and storage medium, which can display a user interface for playing a target video, the target video includes multiple target sub-videos, where the user interface includes an image display area, and each of the target sub-videos in the target video is played sequentially on the user interface while displaying the multiple images, which provides users with the convenience of viewing both the multiple target sub-videos and the multiple images on the same user interface. Since the multiple target sub-videos correspond to the multiple images displayed in the image display area, respectively, users can watch the target sub-video corresponding to a displayed image while viewing the displayed image, and the display of the image can also produce linkage effect with the playing of the target sub-videos, to clearly show the users which target image corresponds to the target sub-video that is being played, so that the users have a better viewing experience; in addition, if there is a first triggering operation acting on any one image, i.e., a target image, displayed in the image display area, then in respond to the first triggering operation, the target information associated with the target image can be displayed by jumping, and the information associated with the target image can be easily obtained, thereby allowing the user to get more information on the target image or the content associated with the target image, and there is no need for users to search for the displayed target image, screen out the content associated with the target image and other tedious operations, and the users only need to perform the first triggering operation on the target image to jump to and display the target information associated with the target image, simplifying the operation steps and thus improving the user experience.

BRIEF DESCRIPTION OF DRAWINGS

In order to illustrate technical solutions in the embodiments of the present disclosure or in the prior art more clearly, the following will briefly introduce the accompanying drawings needed in the description of the embodiments or the prior art. Obviously, the accompanying drawings in the following description are some embodiments of the present disclosure. For those of ordinary skill in the art, other drawings can also be obtained from these drawings without creative labor.

DESCRIPTION OF EMBODIMENTS

Figure 1:
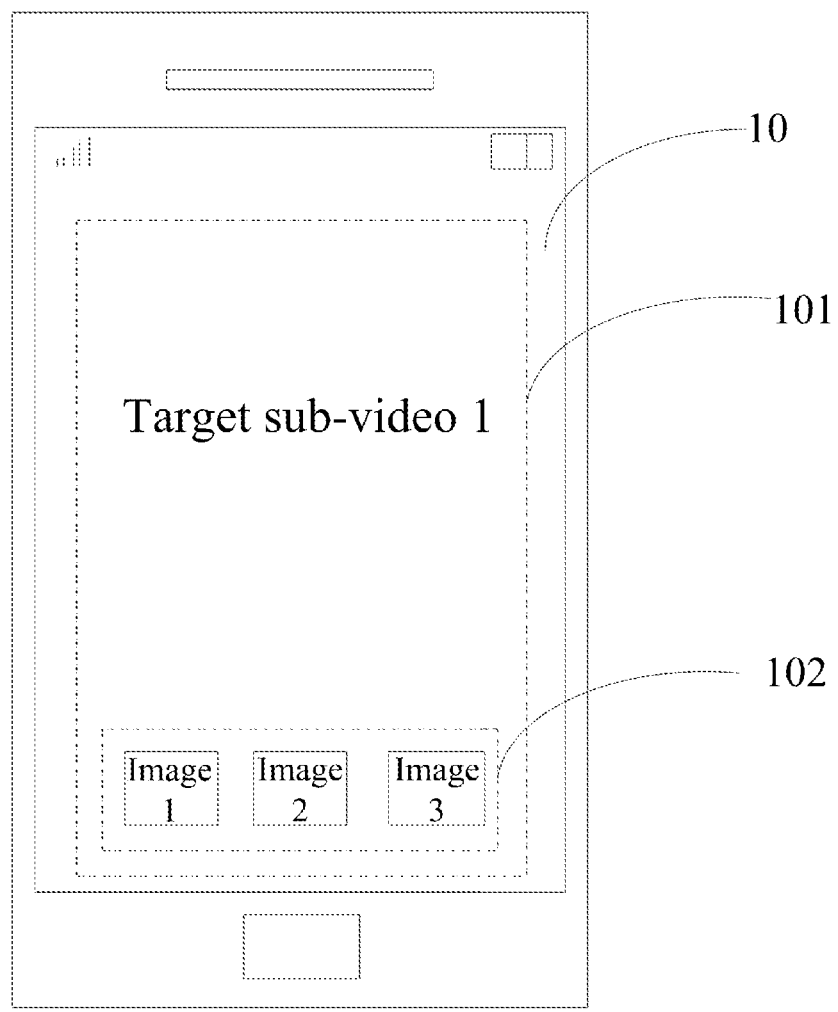
FIG. 1 is a schematic diagram of a user interface provided by an embodiment of the present disclosure.

The following will disclose embodiments of the present disclosure in more detail with reference to the accompanying drawings. Although certain embodiments of the present disclosure are shown in the accompanying drawings, it should be understood that the present disclosure may be realized in various forms and should not be construed to be limited to the embodiments set forth herein, but rather, these embodiments are provided for a more thorough and complete understanding of the present disclosure. It should be understood that the drawings and embodiments of the present disclosure are for exemplary purposes only and are not intended to limit the scope of protection of the present disclosure.

It should be understood that the steps recorded in the method implementations of the present disclosure may be performed in a different order, and/or in parallel. In addition, method implementations may include additional steps and/or omit the indicated steps. The scope of the present disclosure is not limited in this respect.

The term "include" and its variations used in the present disclosure are open, that is, "include but not limited to". The term "based on" is "at least partially based on". The term "an embodiment" means "at least one embodiment"; the term "another embodiment" means "at least one another embodiment"; the term "some embodiments" means "at least some embodiments". Relevant definitions of other terms are given in the following descriptions.

It should be noted that the concepts "first" and "second" mentioned in the present disclosure are intended only to distinguish different apparatus, modules or units and are not intended to define the order or interdependence of the functions performed by these apparatus, modules or units.

It should be noted that references to "one" or "more" in the present disclosure are schematic, rather than restrictive, and those skilled in the field should understand they mean "one or more" unless otherwise expressly stated in the context.

The names of messages or information interacted exchanged between apparatus or modules in embodiments of the present disclosure are for illustrative purposes only and are not intended to limit the scope of such messages or information.

At present, the video playing applications or video players can only provide users with a single video in the playing interface, and cannot provide other information. At the same time, they cannot provide users with convenient and rich functions (for example, query function, etc.), thereby affecting the user experience.

In order to solve the above problems, the technical concept of the present disclosure is to allow multiple displayed images to correspond to multiple sub-videos, so that on the same user interface, the corresponding sub-videos can be played while the images are displayed, and when the user clicks on a certain displayed image, the corresponding target information can be displayed by jumping, thereby providing convenient operation for the user, and enabling the user to quickly and effectively obtain the required information, which not only meets the user's needs, but also improves the user's operation experience.

The technical solution of the present disclosure will be explained in detail in the following specific embodiments. The following specific embodiments can be combined with each other, and the same or similar concepts or processes may not be described in detail in some embodiments.

In a practical application, for a user interface, the executive entity of the embodiment of the present disclosure may be a terminal device, such as a mobile terminal, a computer device (e.g., a desktop, a notebook, an all-in-one computer, etc.), and the mobile terminal may include a mobile device with a playing function, such as a smart phone, a handheld computer, a tablet computer, a wearable device with a display screen, etc. In practical application, the user interface for displaying can be used to play the target video, and the target video can be recommended for the user or randomly pushed, which is not specifically limited in the present disclosure.

In a scenario, referring to FIG. 1, which is a schematic diagram of a user interface provided by an embodiment of the present disclosure, where a terminal device can display a user interface 10 for playing a target video, and the user interface 10 is provided with a video playing area 101 and an image display area 102, where multiple target sub-videos can be played in the video playing area 101 and multiple images can be displayed in the image display area 102. Those skilled in the art should understand that the position and size of the image display area 102 can be set according to actual requirements. According to the embodiment of the present disclosure, the multiple target sub-videos can be played while multiple images are displayed in the image display area 102.

The display method according to the embodiment of the present disclosure can be applied to an image-video linkage scenario, which can include: when sequentially displaying the images, on the same interface, playing corresponding target sub-videos and/or dynamically switching to a target sub-video corresponding to any image when the image is triggered, and playing the corresponding target sub-video at the same time. In addition, the display method according to the embodiment of the present disclosure can also be applied to a detail query scenario associated with an image, for example, when any image is triggered, it supports dynamically switching to an associated target interface corresponding to the image and displaying associated target information corresponding to the image. The present disclosure does not limit the application scenario.

The technical solution of the present disclosure will be explained in detail in the following specific embodiments. The following specific embodiments can be combined with each other, and the same or similar concepts or processes may not be described in detail in some embodiments. The terminal device can display multiple images in the image display area 102 on the first interface 10, and meanwhile sequentially play the target sub-videos corresponding to the images in the video play area 101 on the user interface 10, as shown in FIG. 1 (where FIG. 1 can represent a playing interface where a target sub-video 1 is playing and an image 1 corresponds to the target sub-video 1). Taking an advertising scenario as an example, the image display area 102 can display images of multiple commodities, each image including at least one commodity; sub-videos corresponding to at least one commodity in each image, for example, advertising videos of a corresponding commodity, are sequentially played in the video playing area 101. The target sub-video may include the at least one commodity, and the target sub-video may include the advertisement video of the at least one commodity, or the usage video of the at least one commodity, etc., which is not limited by the present disclosure. The present disclosure does not limit the application scenario.

Figure 2:
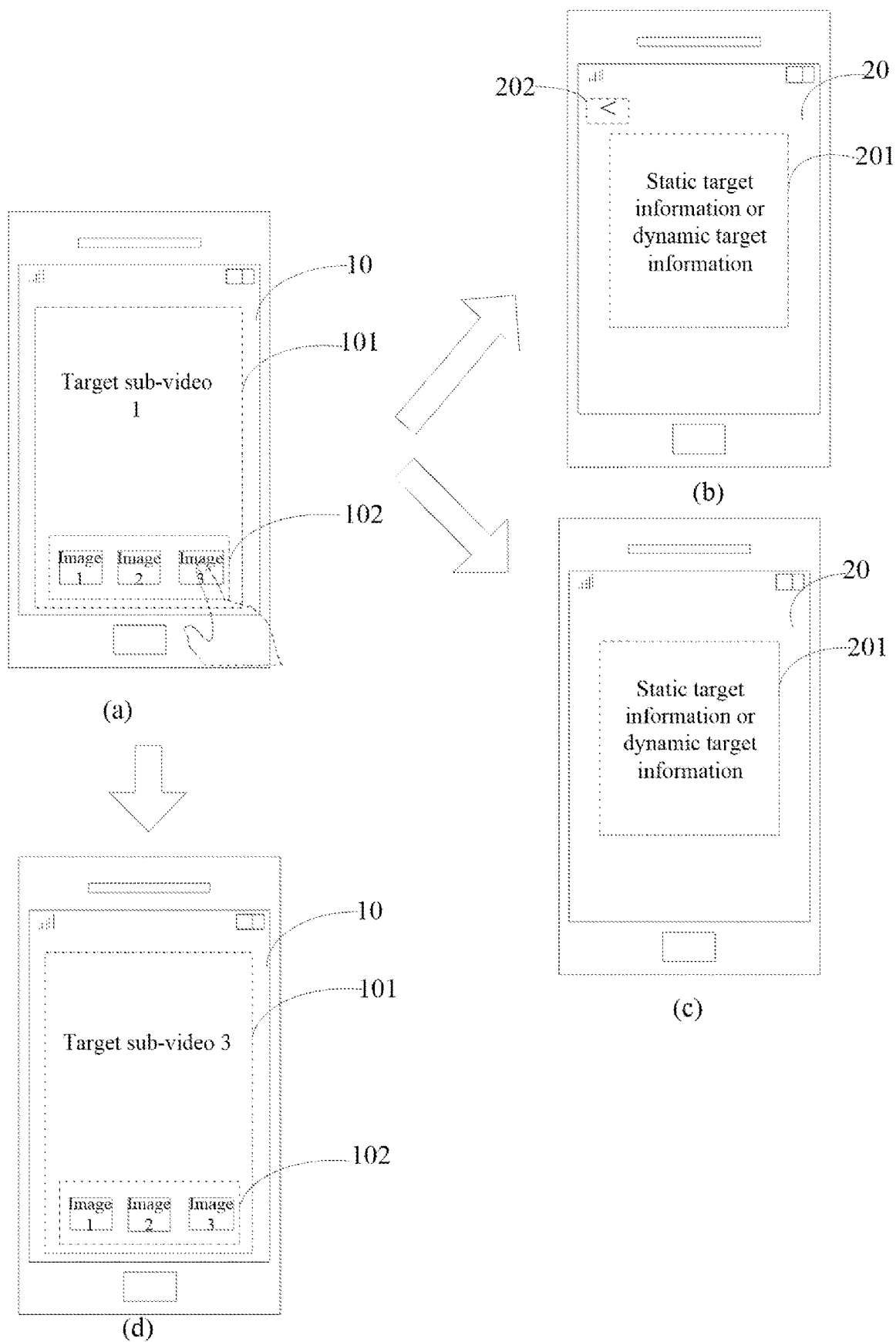
FIG. 2 is a schematic diagram of a scenario of a display method provided by another embodiment of the present disclosure.

When the user wants to query or know the information related to any image in the image display area, he can directly trigger a corresponding image (i.e. a target image, taking the target image as image 3 shown in FIG. 2(*a*) as an example) to jump to and display the target information corresponding to the target image.

In one embodiment, the terminal device can jump to and display the target sub-video corresponding to the target image in response to the triggering operation on the target image, as shown in FIG. 2(*d*).

In one embodiment, the terminal device may jump to the target interface to display the target information in response to the triggering operation on the target image, and the target information may include static target information and/or dynamic target information 201 associated with the target image (here the dynamic target information may include the target sub-video corresponding to the target image or other video corresponding to the target image), as shown in FIGS. 2(*b*) and 2(*c*). As shown in FIGS. 2(*b*) and 2(*c*), the target interface 20 can display the static target information associated with the target image, for example, images, characters or the combinations of images and characters associated with the content in the target image. Taking a certain commodity included in the target image as an example, its associated static target information can include a detailed page of the commodity or a link page corresponding to the commodity, where in the detailed page, the detailed information of the commodity can be provided to the user, and in the link page, the user can link to the detailed page of the commodity or a homepage associated with the commodity. Dynamic target information associated with the target image can also be displayed on the target interface 20. In one embodiment, the dynamic target information may include a target sub-video played on the user interface 10 and associated with the target image, and in addition, the dynamic target information may also include other video associated with the target image. Taking an advertising scenario as an example, in the case where the target image includes a commodity A and the target image corresponds to the target sub-video A1 in the target video, when a user triggering operation for the target image is received, the terminal device can play the target sub-video A1 associated with the commodity A on the target interface 20 or other video associated with the commodity A on the target interface 20 (for example, the video in which the commodity A is being used, etc.). Through the trigger, it is possible to jump to and display the target information corresponding to the target image. This operation is simple and quick, and may provide more display information for the user without complicated query steps, thereby improving the user operation experience.

In addition, in order to show which target image in the image display area corresponds to the target sub-video that is currently being played, the target image corresponding to the target sub-video that is currently being played can also be displayed in a manner of highlighting. The manner of highlighting can include (but not limited to): making the color of the target image or the brightness of the position where the image is located higher than other images, or adding a display box to the target image, and so on.

In addition, due to the influence of the screen space of the terminal device, the image display area may only display a limited number of images (such as three, not limited here) on the current screen, and cannot display all the images in the image display area at the same time. Therefore, when a user wants to watch or view a certain image, he can slide the images on the image display area to view more images, thereby meeting the user's personalized watching or viewing needs. In one embodiment, the terminal device can detect the sliding operation on the image display area, and sequentially display the multiple target sub-videos in the target videos on the user interface according to the sliding operation speed.

Figure 3:
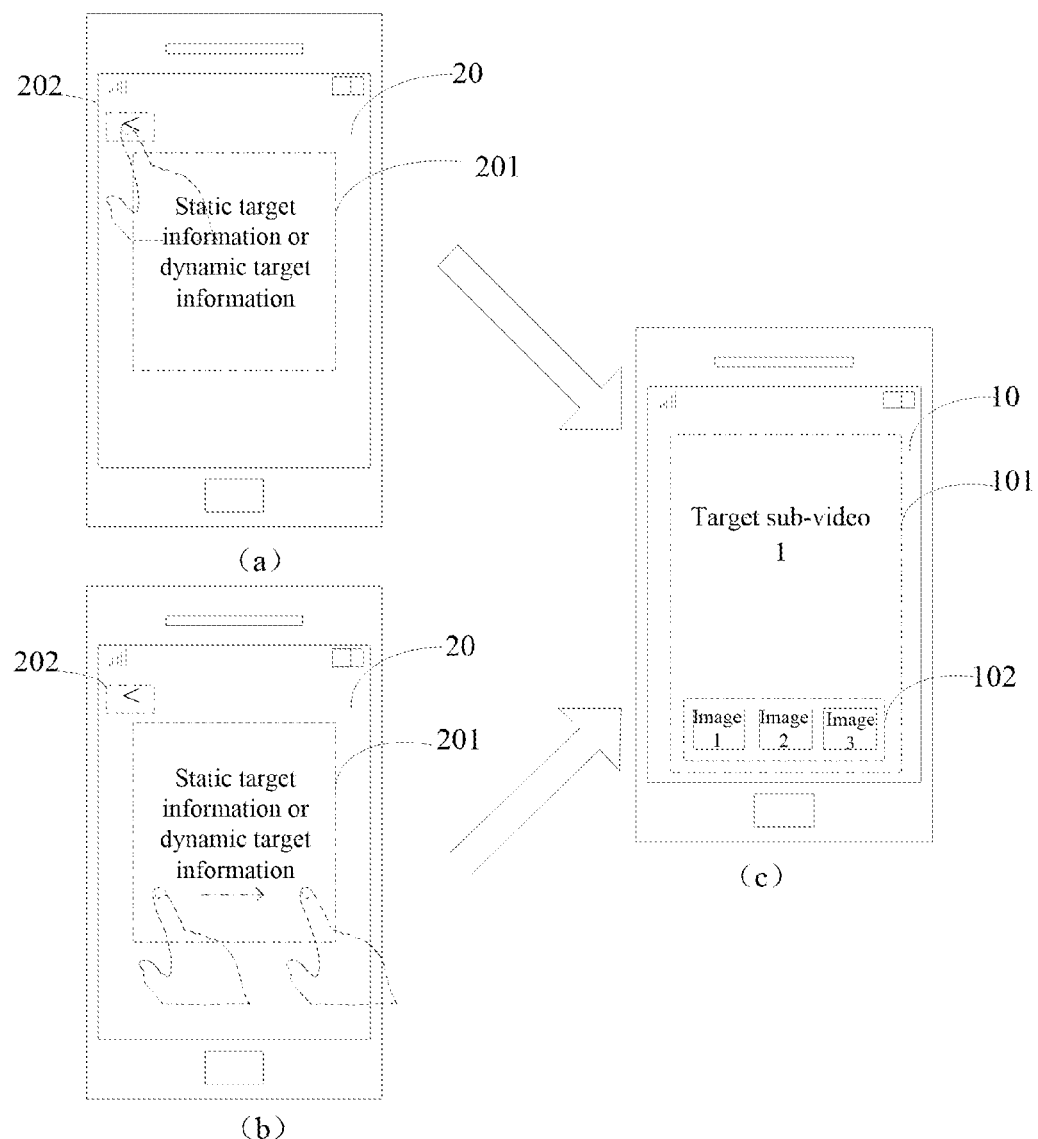
FIG. 3 is a schematic diagram of a scenario of a display method provided by another embodiment of the present disclosure.

In one embodiment, when the terminal device jumps to the target interface and displays the target information associated with the target image, if the terminal device receives a triggering operation performed by the user on the target interface 20, then the display of the user interface is restored. A back button 202 (as shown in FIG. 2(*b*)) or no back button (as shown in FIG. 2(*c*)) may be provided on the target interface 20. Taking the target interface 20 that is provided with the back button 202 as an example, as shown in FIG. 3, if the user wants to return to the user interface, he only needs to perform a corresponding triggering operation on the target interface 20, such as clicking the back button 202 (as shown in FIG. 3(*a*)) or performing a sliding operation (as shown in FIG. 3(*b*)) on the target interface 20, and then the user interface 10 can be displayed again (as shown in FIG. 3(*c*)). The present disclosure does not limit the specific triggering operation. By switching between the target interface and the user interface, browsing convenience can be provided for users, and multi-functional interface display can be realized. Therefore, the present disclosure not only meets the needs of the users, but also improves the operation experience and viewing experience for the users.

In addition, it should be understood by those skilled in the art that the "trigger" operation can include (but is not limited to): click trigger, that is, the user clicks a corresponding button or any position on the interface to realize a triggering operation; gesture trigger, that is, the user makes a corresponding gesture to realize a triggering operation; voice trigger, that is, the user sends a corresponding voice instruction to realize a triggering operation; expression trigger, that is, the user makes a corresponding expression to realize a triggering operation, etc. The present disclosure does not limit the triggering operation.

In one embodiment, the implementation of the display method can be implemented in the following ways.

Figure 4:
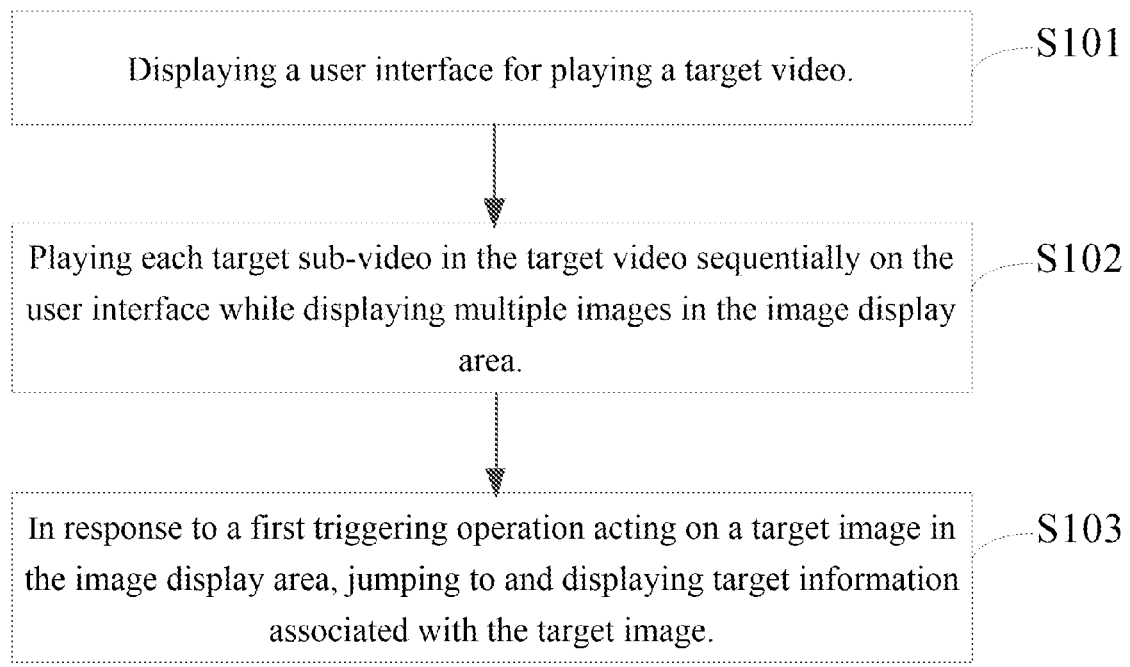
FIG. 4 is a schematic flowchart of a display method provided by an embodiment of the present disclosure.

Referring to FIG. 4, which is a flowchart of an information display method provided by an embodiment of the present disclosure. The information display method can include the following steps S101 to S103.

S101. Displaying a user interface for playing a target video, where the user interface includes an image display area, and the target video includes multiple target sub-videos.

The method of the embodiment of the present disclosure can be applied to a terminal device, and a user interface for playing a target video can be displayed on the terminal device, and the user interface includes an image display area, in which multiple images can be displayed, and the target video can include multiple target sub-videos.

The terminal device can display the user interface through the following steps a1 to a3.

Step a1. Receiving the multiple target sub-videos.

Step a2. Receiving the multiple images, where the multiple images correspond to the multiple target sub-videos, respectively.

In the embodiment of the present disclosure, when a user watching a video (hereinafter referred to as the user) opens the application program, the terminal device can receive multiple videos dispatched by a server, and the terminal device can screen the received multiple videos based on its own performance and/or network status to obtain multiple target sub-videos, and the terminal device also receives the multiple images dispatched by the server, and each of the images corresponds to one screened target sub-video, that is, the multiple images correspond to the multiple target sub-videos, respectively. For example, for a target sub-video, the image corresponding to it may include an image related to the content in the target sub-video. For example, if a target sub-video includes advertisement videos of one or more commodities, a corresponding image may include images of the one or more commodities; if a target sub-video includes a recorded short video of scenery, a corresponding image may include an image of a scenic spot taken in the short video or an image of a creator who took the short video, etc., and the present disclosure does not limit this.

Step a3. According to the multiple target sub-videos and the multiple images, playing each of the target sub-videos sequentially while displaying the multiple images on the user interface.

According to the acquired target sub-videos and images, the terminal device displays, through a correspondence between each target sub-video and corresponding image, the images and meanwhile plays the target sub-videos sequentially on the user interface. The terminal device can establish correlation between each target sub-video and the corresponding image according to the correspondence between the target sub-video and each image, and according to the correlation, the linkage effect between the videos and images on the user interface can be realized, providing users with rich viewing experience.

In an embodiment of the present disclosure, the formation of the target video may include at least the following two ways.

First way, the target video can be formed by splicing the multiple target sub-videos. The terminal device can splice the multiple target sub-videos into a target video, and record playing orders and playing durations corresponding to the target sub-videos in the target video.

In one embodiment, the terminal device can screen multiple videos, and create asynchronous tasks for the screened videos respectively and preprocess and download the screened videos, and the preprocessed and downloaded videos are used as the multiple target sub-videos. Where, the preprocessing process can select a playing address with appropriate definition and bit rate according to the performance of the terminal device, network status and other factors. In order to ensure that the playing order of the final composite video is the same as the sending order, the terminal device can wait for all the sub-videos to be downloaded before storing them, and then store them in order. The terminal device inputs the received sub-videos into a video synthesis model for sequential splicing, and stores the generated target video into a memory of the terminal device. When the target video is played on the user interface, the terminal device can directly read the target video in the corresponding memory directory. The terminal device can also record the playing order and playing duration corresponding to each of the target sub-videos in the target video, so as to provide support for the jumping and playing between the target sub-videos and to provide support for the linkage technology between each of the target sub-videos and the corresponding image, so as to ensure the linkage effect.

Specifically, the terminal device splicing the target sub-videos into the target video can include: performing sequential splicing operations on the target sub-videos according to a preset order to generate the target video; taking the preset order as a corresponding playing order of the target sub-videos. Here, the preset order can be a storage order in which all sub-videos are stored in order after being downloaded. Based on the storage order, the multiple target sub-videos can be spliced sequentially through the video synthesis model, to generate the target video.

For example, the terminal device downloads all the target sub-videos to be spliced and stores them in a preset order, and then sequentially splices the target sub-videos to be spliced so as to generate the target video.

In one embodiment, the mobile terminal may input the received multiple sub-videos into a video synthesis model for synthesizing the multiple target sub-videos into a target video, and perform sequential splicing, to generate the target video.

Exemplarily, the video synthesis model may include a template for sub-videos to be added, and the terminal device inputs the multiple sub-videos into the template for sub-videos to be added in the video synthesis model in order. After the input operation is finished, the terminal device triggers a video splicing instruction to instruct the video synthesis model to combine the multiple sub-videos in the template for sub-videos to be added into a long video in the order of inputting the multiple sub-videos, that is, forming a target video, where the target video is the spliced video based on the above first way. Playing the target sub-videos in the target video sequentially on the user interface can be realized by the following steps b1 to b2.

Step b1. Obtaining a playing order and a playing duration of each of the target sub-videos in the target video.

Step b2. Playing each of the target sub-videos in the target video on the user interface sequentially, according to the playing order and playing duration.

After synthesizing the target video, the terminal device can record the playing order and playing duration corresponding to each of the target sub-videos in the target video, where a playing start time point of a next target sub-video in the target video can be determined according to the playing order and playing duration. For example, taking the target video including three target sub-videos A1, B1 and C1 as an example, if a playing order of A1, B1 and C1 is A1, B1 and C1, i.e., a current arrangement order (that is, play A1 first, then play B1, and then play C1), and the playing durations corresponding to A1, B1 and C1 are 20 s, 30 s and 25 s, respectively, then when the target video starts to play from the target sub-video A1, the playing start time point of A1 is the 0th s in the target video, the playing start time point of the target sub-video B1 is the 20th s in the target video, and the playing start time point of the target sub-video C1 is the 50th s in the target video. After the playing of C1 is finished, the terminal device can replay the target video on the user interface, so in the next round in which the target video is played, it can be retimed: the playing start time point of the target sub-video A1 is the 0th s in the target video, and so on. In this way, the terminal device sequentially plays the corresponding target sub-videos on the user interface based on the corresponding playing order and the corresponding playing duration of the target sub-videos.

Second way, in one embodiment, the terminal device plays the target video by loading a next target sub-video.

In an embodiment of the present disclosure, the terminal device realizes the sequential playing of multiple target sub-videos by preloading or real-time loading the target sub-videos. For example, when playing a first target sub-video, the terminal device can obtain the playing address of a second target sub-video in the video list stored in advance or dispatched by the server, and preload the second target sub-video, and continue to play the preloaded second target sub-video after playing of the first target sub-video is finished; or, the next target sub-video to be played is acquired for playing at a moment when playing of the first target sub-video is finished, and so on, so that the target video is played by switching the target sub-videos in real time.

Where, based on the second way, playing each of the target sub-videos in the target video sequentially on the user interface can be realized by executing the following steps c1 to c2 sequentially for each of the target sub-videos.

Step c1. Obtaining a playing address of a corresponding target sub-video.

Step c2. Obtaining the corresponding target sub-video according to the playing address obtained, and obtaining a playing address of a next target sub-video while playing the corresponding target sub-video on the user interface.

In an embodiment of the present disclosure, the playing order of each of the target sub-videos can be obtained, and according to the playing order, the following operations are performed for each of the target sub-videos: obtaining a playing address of a corresponding target sub-video; obtaining the corresponding target sub-video according to the playing address obtained, and obtaining a playing address of a next target sub-video while playing the corresponding target sub-video on the user interface, and so on, repeatedly performing the above operations to realize the sequential playing of each of the target sub-videos on the user interface.

Specifically, after receiving a user's refresh operation on an information stream and before accessing the user interface, the terminal device will preload a first video (first target sub-video) according to the playing address. The terminal device plays the first video and meanwhile preloads the remaining target sub-videos in the background. Before playing the video, the terminal device will dynamically select the playing address and a bit rate to achieve the best playing effect. After playing of the first video is finished, the terminal device will switch to and play a second video (second target sub-video) in real time. If the preloading is successful, a preloaded video data can be directly used to play, reducing the network-induced lag. Similarly, after playing of the second video is finished, it will switch to and play a third video (third target sub-video) in real time, and so on. When the last associated video is completely played, the terminal device can replay the first video, thereby realizing the effect of continuously and circularly playing the multiple videos.

Returning to FIG. 4, step S102: playing each target sub-video in the target video sequentially on the user interface while displaying the multiple images in the image display area.

In an embodiment of the present disclosure, the multiple target sub-videos respectively correspond to the multiple images displayed in the image display area, that is, one target sub-video corresponds to one image, having a correspondence, so that each target sub-video in the target video is sequentially played while displaying the multiple images in the image display area. In one embodiment, when the user triggers a corresponding image, corresponding target information can be displayed by jumping.

In an embodiment of the present disclosure, the display method is described in detail on the basis of the above embodiments. The display method may further include: establishing a correlation relationship between each target sub-video and a corresponding image according to the correspondence between the multiple target sub-videos and the multiple images.

In an embodiment of the present disclosure, in order to realize the linkage between the multiple target sub-videos and the multiple images, the correlation relationship between each target sub-video and the corresponding image can be established according to the correspondence between each target sub-video and each image. For example, in an example where the multiple target sub-videos include three target sub-videos A1, B1, C1 and the multiple images include A11, B11, C11, where A1 corresponds to A11, B1 corresponds to B11, and C1 corresponds to C11, the correlation between each target sub-video and the corresponding image is generated by establishing an index between the target sub-videos and the corresponding images, according to this one-to-one correspondence, and then the terminal device can simultaneously display each target sub-video and the corresponding image according to the correlation.

In an embodiment of the present disclosure, according to the correspondence between the multiple target sub-videos and the multiple images, establishing a correlation relationship between each target sub-video and the corresponding image can be realized by the following steps d1 to d2.

Step d1. Storing video information of the multiple target sub-videos into a video list, and storing image information of the multiple images into an image list.

Step d2. According to the correspondence between the multiple target sub-videos and the multiple images, establishing the correlation relationship between each target sub-video and the corresponding image through the video list and the image list.

In the embodiment of the present disclosure, a mapping relationship between lists can be used to realize the establishment of the correlation relationship between the contents in the respective lists. Specifically, the video information of the multiple target sub-videos (for example, one or more kinds of information in the playing order, playing address, playing duration, etc. of the multiple target sub-videos) is stored in the video list, and at the same time, the image information of the multiple images (such as the storage address of the images, etc.) is stored in the image list, and then based on the correspondence between each target sub-video and the corresponding image (for example, there is a unique correspondence between an identifier of the target sub-video and an identifier of the corresponding image), the correlation relationship between each target sub-video and the corresponding image can be established through the video list and the image list, so as to realize the association between each target sub-video and the corresponding image.

In one embodiment, an index can be established for each target sub-video in the video list, and the target sub-video can be mapped to the image corresponding to the sub-video in the image list through the index, thereby establishing a correlation relationship between each target sub-video and the corresponding image. In addition, it is also possible to establish an index for each target image in the image list, and map the image to the target sub-video corresponding to the image in the video list through the index, so as to establish correlation relationship between each target sub-video and the corresponding image. The present disclosure does not limit the establishment of the correlation relationship. Therefore, through the established correlation relationship, the linkage between each target sub-video and the corresponding image can be realized, instead of playing the video on the user interface alone, which provides users with more functions and display effects and improves the user experience.

Returning to FIG. 4, in step S103, in response to a first triggering operation acting on a target image in the image display area, jumping to and displaying target information associated with the target image, where the target image includes any one of the images displayed in the image display area.

In the embodiment of the present disclosure, the target information here may include static target information or dynamic target information associated with the target image. Therefore, when it is detected that a triggering operation acts on any one of the multiple images, that is, acting on the target image, in response to the triggering operation, it is possible to jump from the currently played target sub-video to and display the target sub-video corresponding to the target image on the current interface (i.e., the user interface), and is also possible to jump to the target interface, and display the static target information associated with the target image on the target interface or play the dynamic target information associated with the target image on the target interface (here, the dynamic target information may be a video associated with the target image, for example, a target sub-video corresponding to the target image or other video associated with the target image, and there is no specific limitation on this here). The target interface here can be other interface different from the user interface.

In one embodiment, when a user triggers any of the images on the image display area on the user interface, it is possible to jump to a related page (i.e., the target interface) associated with the image, and display the target interface through the terminal device; or, it is possible to jump from a currently played target sub-video to and display the target sub-video corresponding to the target image on the user interface. In addition, in one embodiment, it is also possible to jump to and display different target information by setting a different triggering operation. The triggering operation here may include click operation, double-click operation or press operation. For example, a first triggering operation is used to trigger the target image to play a corresponding target sub-video, and a second triggering operation is used to trigger the target image to jump to a target interface and display the dynamic target information or static target information associated with the target image. For example, here, the first triggering operation and the second triggering operation can be double-click operation and press operation, respectively, as long as the two different triggering operations can be distinguished, and there is no specific limitation on what operation is included, and the settings thereof can be customized.

In an embodiment of the present disclosure, how to jump to and display the target information associated with the target image in response to the first triggering operation can be explained in detail through the following two scenarios. In response to the first triggering operation acting on the target image in the image display area, jumping to and displaying the target information associated with the target image may include:

in response to the first triggering operation, jumping to and displaying static target information or dynamic target information associated with the target image. The following two examples (Example 1 and Example 2) will be used for detailed explanation.

Example 1: for the scenario of jumping to and playing the target sub-video corresponding to the target image from the currently played target sub-video on the user interface. Specifically, in response to a first triggering operation acting on a target image, a first target sub-video corresponding to the target image is displayed by jumping through the correlation relationship, where the target image includes any of the multiple images.

Specifically, it can be realized in at least two ways.

One way can be realized on the basis of the first way mentioned above. For example, in response to a detected triggering operation of the user on the target image, the terminal device searches the corresponding target sub-video information in the video list according to the index of the target image, obtains the information, such as the playing order and playing duration, in the video information, and then calls the system interface of the video player to automatically jump to the designated time point to start playing, thus realizing the linkage switching effect between the image and the target sub-video.

Another way can be realized on the basis of the second way mentioned above. In response to the user's triggering operation on the target image, the terminal device searches the corresponding target sub-video information in the video list according to the index of the target image, obtains the playing address in the video information, and calls the player's playing method to play the target sub-video, thus realizing the linkage switching effect between the image and the corresponding target sub-video.

In an embodiment of the present disclosure, how to display the first target sub-video corresponding to the target image by jumping through the correlation relationship is explained in detail. In response to the first triggering operation acting on the target image, displaying the first target sub-video corresponding to the target image by jumping through the correlation relationship, can be realized by the following steps e1 to e2.

Step e1. Determining the first target sub-video corresponding to the target image through the correlation relationship in response to the first triggering operation acting on the target image.

Step e2. Searching the video information of the first target sub-video in the video list, where the video information includes at least one of the playing order, playing duration and playing address of the first target sub-video; and playing the first target sub-video according to the video information corresponding to the first target sub-video.

When the target video is realized in the first way, the video information includes the playing order and playing duration of the corresponding target sub-videos. In response to the detected triggering operation of the user on the target image, the terminal device searches the corresponding first target sub-video information in the video list according to the index of the target image, obtains the playing order and playing duration in the video information, and adjusts to jump to and play the first target sub-video according to the playing order and playing duration corresponding to the first target sub-video, thereby realizing the linkage switching effect between the image and the corresponding first target sub-video.

When the target video is played in the above way two, the video information includes the playing address of the corresponding target sub-video. In response to the user's triggering operation on the target image, the terminal device searches the corresponding target sub-video information in the video list according to the index of the target image, obtains the playing address in the video information, and obtains and plays the target sub-video according to the playing address, thereby realizing the linkage switching effect between the image and the corresponding target sub-video.

Exemplarily, as shown in FIG. 2, if the target sub-video 1 is currently being played, then when the user wants to watch the target sub-video 3 corresponding to the image 3, as shown in FIG. 2(a), the user can trigger the image 3, and when the terminal device detects the triggering operation acting on the image 3, it responds to the triggering operation acting on the image 3, the first target sub-video (i.e., the target sub-video 3) corresponding to the image 3 is determined through the correlation relationship, and the video information of the first target sub-video is searched in the video list, so as to jump to and play the target sub-video 3 on the user interface, as shown in FIG. 2(d).

Example 2: for jumping to and displaying a target interface, and playing the static target information or dynamic target information corresponding to the target image on the target interface. Here, the static target information can include landing page and other static target information, such as target image related images, characters, or combinations of the images and characters. The dynamic target information may include the target sub-video corresponding to the target image or other videos associated with the target image.

In practical application, the target interface here can display the detailed page of the target image, or detailed page of other image associated with the image, or links or thumbnails to access to the detailed page. The detailed page may include a page containing an image or text information associated with the image; there is no specific limitation on the specific content contained on the target interface. In addition, the target interface can also display a video (for example, the target sub-video corresponding to the target image or other video associated with the target image), or static target information, or simultaneously display the video and the static target information.

In the embodiment of the present disclosure, when the user wants to inquire or know the information related to any image in the image display area (such as the static target information, the dynamic target information, etc.), he can directly trigger the corresponding image (i.e., the target image, as shown in FIG. 2(a), the target image is image 1), then the associated interface corresponding to the target image, i.e., the target interface 20 associated with the target image) is displayed by jumping. The target interface 20 is used to display static target information or dynamic target information 201 associated with the target image (here, the dynamic target information may include videos related to the target image), as shown in FIG. 2.

In an example where the target image includes a commodity, the associated static target information may include a detailed page of the commodity or a link corresponding to the commodity, where the detailed page can provide detailed information of the commodity for the user, and the user can access to the detailed page of the commodity or the homepage associated with the commodity through the link. The dynamic target information associated with the target image can also be displayed on the target interface. The dynamic target information may include a video advertisement of the commodity, a usage video of the commodity, etc., and the present disclosure does not limit on this.

The information display method provided by the present disclosure can display a user interface through a terminal device, and the user interface can be used for playing a target video, where the user interface can include an image display area, and the target video includes multiple target sub-videos, thereby providing convenience for users to watch multiple target sub-videos one time and displaying multiple images in the image display area. When displaying the multiple images, the target sub-videos in the target video are sequentially played on the user interface, and since the multiple target sub-videos respectively correspond to the multiple images displayed in the image display area, the user can watch the displayed images and meanwhile watch the target sub-videos corresponding to the displayed images, so that the display of the images and the playing of the target sub-videos produce a linkage effect, to clearly show to the user which target image corresponds to the target sub-videos that is being played, bringing the user a good viewing experience. If there is a first triggering operation acting on any image (i.e., the target image) displayed in the image display area, then in response to the first triggering operation acting on the target image in the image display area, the target information associated with the target image is displayed by jumping, and thus the information associated with the target image can be conveniently obtained, so that the user can obtain more information about the target image or the content associated with the target image, without need for the user to search the displayed target image, screen out the content associated with the target image and other complicated operations, but only need to perform the first triggering operation on the target image to jump to and display the target information associated with the target image, thereby simplifying the operation steps and further improving the user experience.

In practical application, jumping from the user interface to the target interface and then redisplaying the user interface is explained by the following two examples (Example 21 and Example 22).

Example 21: when jumping from the user interface to the target interface, pause playing of the target sub-video in playing state on the user interface first, and when returning from the target interface to the user interface, continue to sequentially play from the paused target sub-video.

Where, the process of pausing playing can be realized at least by the following steps:

in response to the first triggering operation, pausing playing of the first target sub-video that is currently in playing state on the user interface; and recording a pause time when the playing of first target sub-video is paused.

Figure 5:
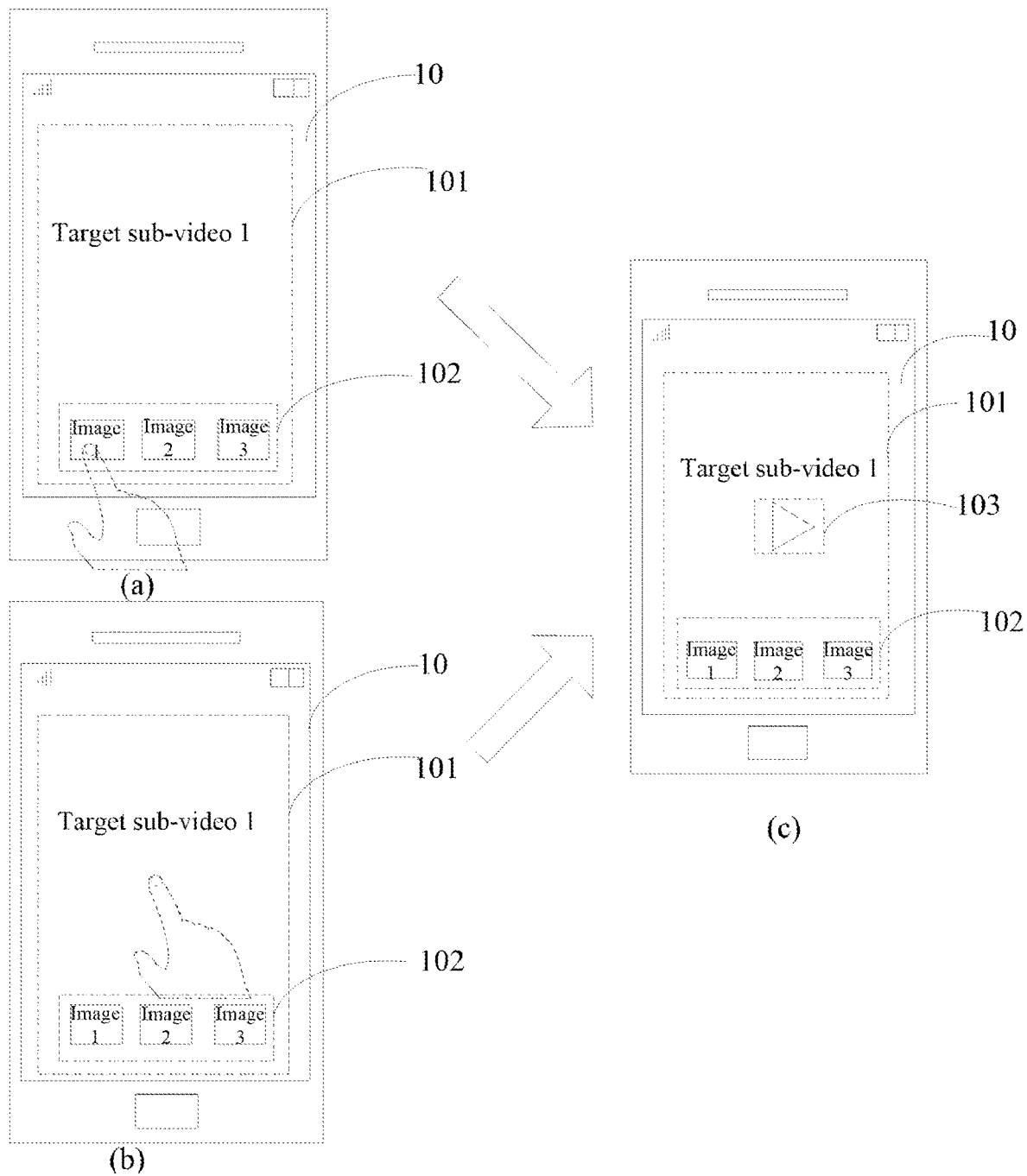
FIG. 5 is a schematic diagram of a scenario of a display method provided by another embodiment of the present disclosure.

In the embodiment of the present disclosure, as shown in FIG. 1 and FIG. 3, when the target video on the first interface is in playing state, when the user clicks on an image in the image display area to jump to the target information to display the target interface, the terminal device controls the sub-video that is currently in playing state (i.e., the first target sub-video) on the user interface to pause, and records the corresponding pause time when the first target sub-video is paused, so that the user can continue to sequentially play the previous videos which has not been played when returning to the user interface. As shown in FIG. 5 (an example where the user interface is currently playing video 1 and displaying image 1), it should be noted that the interface corresponding to a video in a pausing state on the user interface is not specifically limited in the present disclosure, and only exemplary, as long as it can be distinguished from the user interface in which a video is playing, and then it can clearly display to the user that the current state of the user interface can be identified by some target marks 103 in addition to the dynamic/static state of the video and/or image to indicate the current state of the user interface. Where, in FIG. 5(*a*) and FIG. 5(*c*) as shown, the interface FIG. 5(*c*) may not be displayed, but realized by internal logic, and when restoring from the target interface to the user interface, FIG. 5(*c*) may be displayed first before playing continuously, or a direct play may be performed without displaying FIG. 5(*c*). In addition, the operation of changing the user interface from the playing state to the pausing state can be shown in FIGS. 5(*b*) to 5(*c*).

Specifically, the step of restoring the display of the user interface can be realized in the following ways:

in an embodiment of the present disclosure, when displayed is the target interface, performing a triggering operation, and the display method can further include:

in response to a second triggering operation acting on the target interface, restoring the display of the user interface; and starting from the pause time, playing the first target sub-video continuously on the user interface, and displaying the multiple images in the image display area.

Where, when the pause time is the time when the first target sub-video finishes playing, the next target sub-video following the first target sub-video is continuously played on the user interface, and the multiple images are displayed in the image display area.

In the embodiment of the present disclosure, when displayed is the target interface, the target interface is switched to the user interface by triggering the second triggering operation on the target interface. Here, the second triggering operation can be to click the back button (or the back identifier) 202 on the target interface (shown in FIG. 3 (*a*)) or perform clicking, pressing or sliding operation in a preset area on the target interface (the sliding operation is as shown in FIG. 3 (*b*)), without specific limit here, where the preset area can be any area on or outside the images and/or videos displayed on the target interface, and is not specifically limited here.

Specifically, in response to the second triggering operation, the user interface can be redisplayed, and starting from the recorded pause time, the target sub-video that was previously paused on user interface can be restored to play, and the multiple images can be sequentially displayed in the image display area according to the order of the target sub-videos to be currently played, and as shown in FIG. 5, on the basis of FIG. 5(*c*), the display of the user interface 10 can be restored, and start to continue playing, as shown in FIG. 1.

Figure 6:
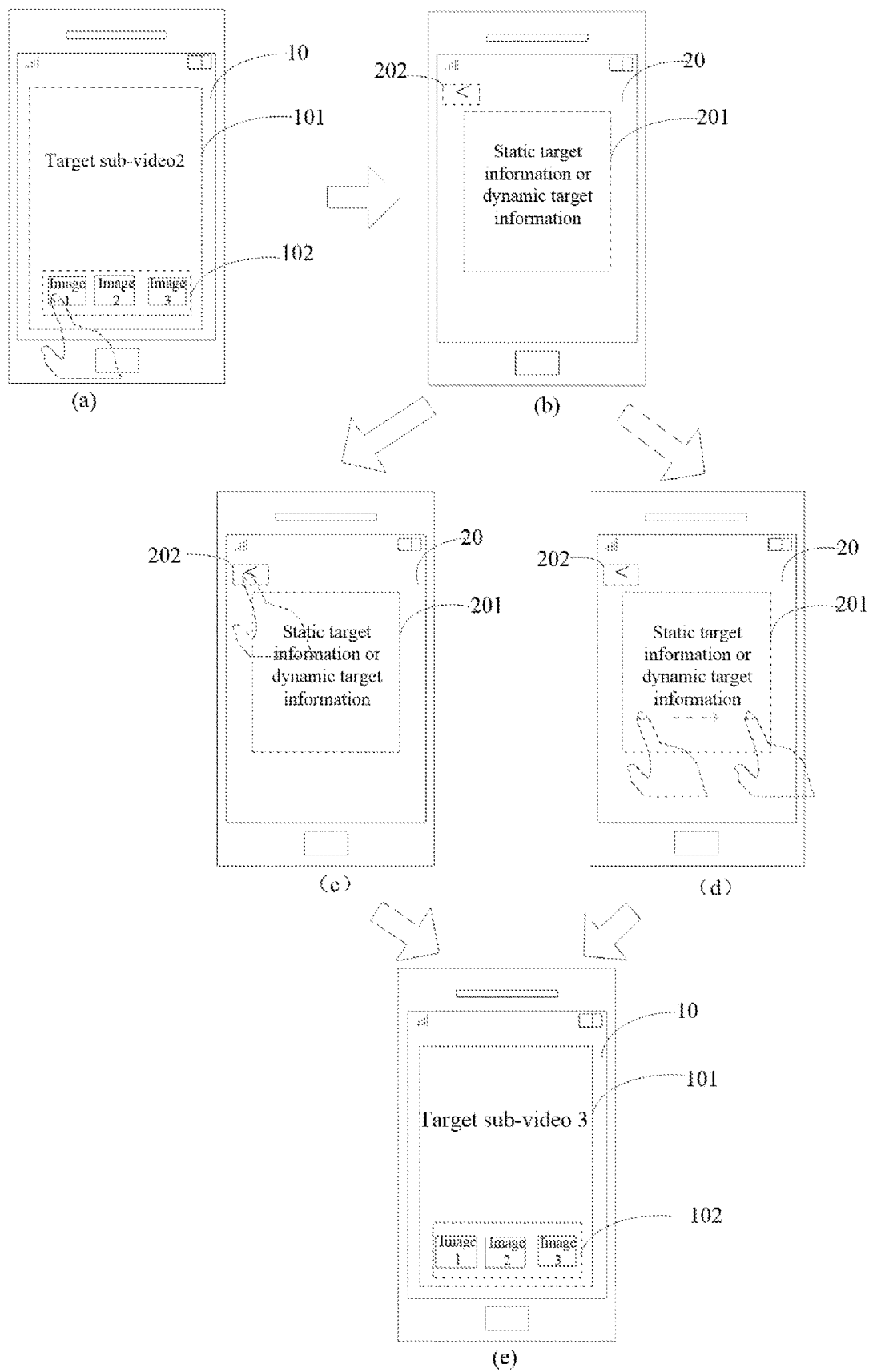
FIG. 6 is a schematic diagram of a scenario of a display method provided by another embodiment of the present disclosure.

Example 22: as shown in FIG. 6, after responding to the first triggering operation, jump to the target interface 20 without changing the dynamic/static state of the target video and/or image on the user interface, and when returning from the target interface to the user interface 10, it is necessary to determine the corresponding target sub-video to be played and the corresponding image to be displayed on the user interface according to an occurrence time on the target interface.

Specifically, the display method can be realized by the following steps f1 to f2.

Step f1. After jumping to the target interface, continue to play the target video.

Step f2. In response to a third triggering operation acting on the target interface, jumping to and displaying the user interface, and playing the target video continuously on the user interface.

In the embodiment of the present disclosure, after jumping to and displaying the target interface, the target video can be continuously played in the background, and when the target interface is restored to the user interface, the corresponding target sub-video can be continuously played on the user interface according to the background playing progress.

In a scenario, as shown in FIG. 6 (*a*), in an example where video 2 is currently playing and image 2 is currently displaying on the user interface and the user has clicked on image 1 to jump to the target interface 20 corresponding to image 1, the terminal device starts timing in response to the first triggering operation and after jumping to the target interface (as shown in FIG. 6(*b*), the static target information or dynamic target information 201 associated with the target image is displayed on the target interface, and since the target image shown in FIG. 6(*a*) is image 1, the static target information or dynamic target information shown in FIG. 6(*b*) is the target information associated with image 1), and monitors in real time whether there is a triggering operation, i.e., the third triggering operation, acting on the target interface, where the third triggering operation may be the same as or different from the second triggering operation in scenario 1, without limit here. If the third triggering operation is detected (see FIG. 6(*c*) or 6(*d*), where FIG. 6(*c*) corresponds to FIG. 3(*a*) and FIG. 6(*d*) corresponds to FIG. 3(*b*)), the user interface is restored to display in response to the third triggering operation, and at this time, the target sub-video to be replayed and the playing time point of the target sub-videos when the user interface is restored can be determined based on the timed duration in combination with the playing order and playing duration of each video in the target video, and then, according to the target sub-video and the determined playing time point, the corresponding target sub-video is played on the user interface and the playing progress of the target sub-video is adjusted, as shown in FIG. 6 (*e*). For example, the terminal device can determine a time point for restoring playing according to the timed duration plus the playing duration, and determine the target sub-video for playing and its playing progress according to the time point for restoring playing. In this scenario, the target sub-video can be played flexibly, not affected by the back-and-forth switching between interfaces, that is, the playing progress of the target sub-video played on the user interface is not affected during the switching between the user interface and the target interface.

In one embodiment of the present disclosure, on the basis of the above embodiment, S102 is also explained in detail. The video information may include the playing order of the target sub-videos; and, playing each target sub-video in the target video sequentially on the user interface while displaying multiple images in the image display area, can be realized by the following steps g1 to g3.

Step g1. Acquiring the playing order in the video information.

Step g2, According to the correlation relationship between the multiple target sub-videos and the multiple images, determining the playing order corresponding to the multiple target sub-videos as an initial display order of the corresponding images.

Step g3. According to the playing order, playing each target sub-video on the user interface, and adjusting the display state of the multiple images on the user interface according to the playing progress of each target sub-video.

In the embodiment of the present disclosure, firstly, the playing order of the multiple target sub-videos is obtained from video information, then the corresponding target sub-videos are searched in the video list according to the playing order, and at the same time, according to the correlation relationship between the multiple target sub-videos and the multiple images, the playing order of the multiple target sub-videos is used as the initial display order of the corresponding images, and then each target sub-video is played on the user interface according to the playing order, and the display state of the multiple images on the user interface is adjusted according to the playing progress of each target sub-video. Adjusting the display state of the multiple images on the user interface may include (but is not limited to) at least one of the following: highlighting the image corresponding to the currently played target sub-video in the image display area; and adjusting the display position of the image in the image display area according to the current playing progress.

The following scenarios are used for illustration.

Scenario 1. Highlighting the image corresponding to the target sub-video currently being played in the image display area.

Figure 7:
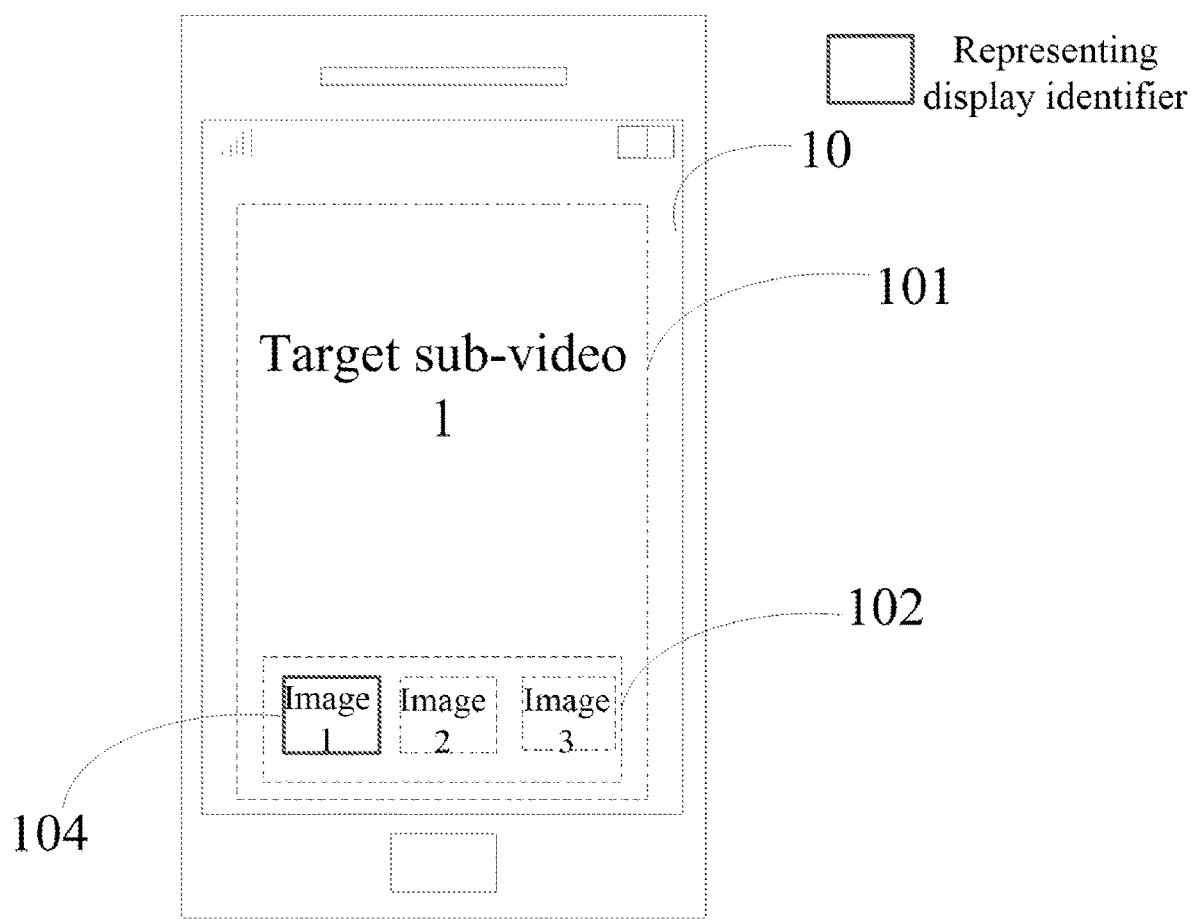
FIG. 7 is a schematic diagram of a scenario of a display method provided by another embodiment of the present disclosure.

In the embodiment of the present disclosure, in order to display which target image in the image display area corresponds to the target sub-video that is currently being played, the target image corresponding to the target sub-video currently being played can be displayed in a highlighted manner. The highlighted manner may include (but not limited to): making the image color of the target image and/or the brightness of the position where the image is located higher than other images; and adding a display box for the target image. As shown in FIG. 7, the target sub-video 1 is currently being played on the user interface 101, and the image 1 is highlighted on the image display area 102 by the display identifier 104, with the image 1 being related to, that is, corresponding to, the target sub-video 1.

Scenario 2. Adjusting the display position of the image in the image display area according to the current playing progress.

In the embodiment of the present disclosure, due to the influence of the screen space of the terminal device, it may be that only a limited number of images (such as three, not limited here) are displayed in the image display area on the current screen, but not all the images can be simultaneously displayed in the image display area. Therefore, in order to display all the images to the user, the terminal device can change and display the corresponding images in the image display area in a window sliding mode according to the playing progress of each target sub-video.

Where, one window sliding mode includes: when the terminal device finishes playing of the target sub-video corresponding to the last image displayed in the current image display area (for example, the rightmost image in the image display area), the window length occupied by one image in the image display area is taken as the sliding step length, the first image currently displayed in the image display area (for example, the leftmost image in the image display area) is moved out of the image display area, and meanwhile, other images are moved sequentially (for example, moving leftwards), and in this case, the following second image, the third image and the fourth image are displayed in the image display area, and the target sub-video 4 corresponding to the fourth image is currently being played; and so on, the terminal device can circularly play the target sub-videos and circularly display the corresponding images in the image display area.

Figure 8:
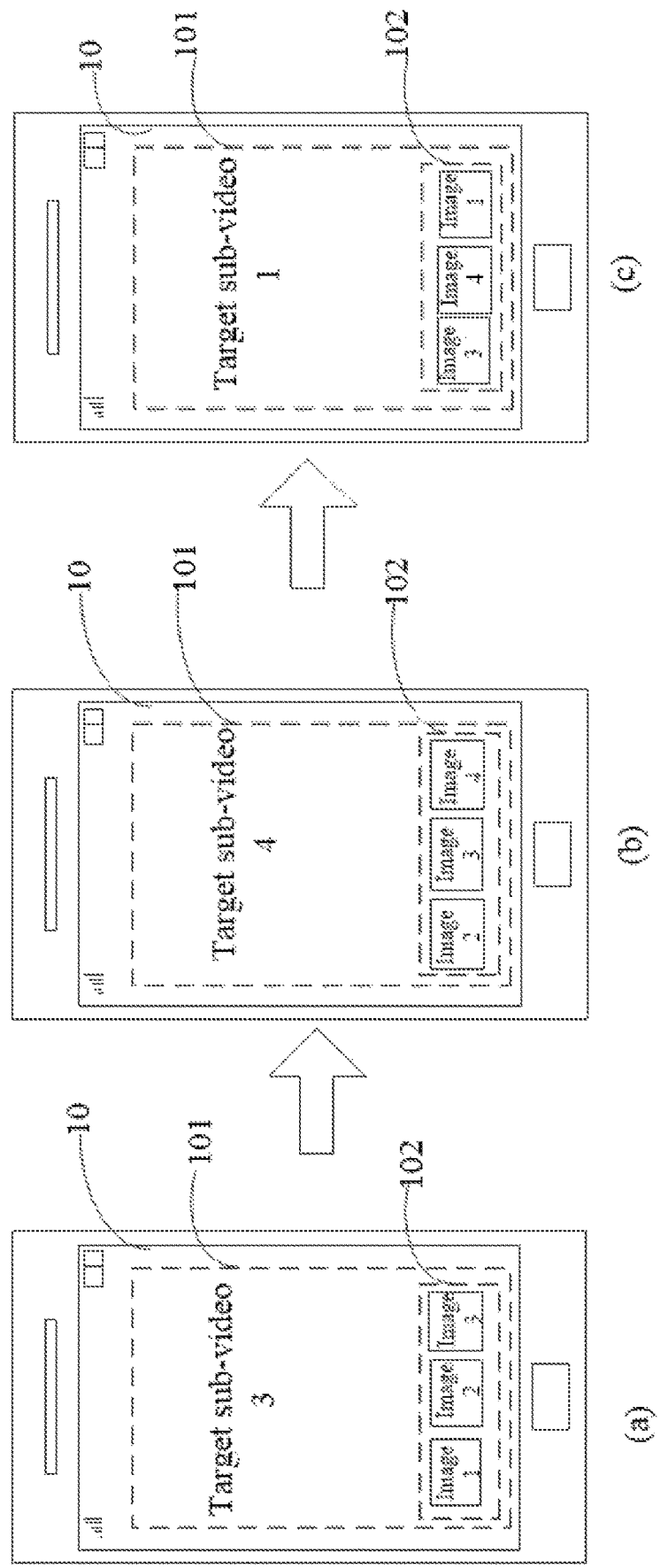
FIG. 8 is a schematic diagram of a scenario of a display method provided by another embodiment of the present disclosure.

Exemplarily, as shown in FIG. 8, the target videos include four target sub-videos (target sub-video 1, target sub-video 2, target sub-video 3 and target sub-video 4), and the multiple images include four images (image 1, image 2, image 3 and image 4), and three images can be simultaneously displayed in the image display area. After the user interface is turned on, when the target sub-video 1, the target sub-video 2 and the target sub-video 3 are sequentially played, the image 1 corresponding to the target sub-video 1, the image 2 corresponding to the target sub-video 2 and the image 3 corresponding to the target sub-video 3 are displayed in the image display area 102. Firstly, as shown in FIG. 8 (a), exemplarily, the target sub-video 3 is currently being played; as shown in FIG. 8 (b), when the target sub-video 3 finishes playing and the target sub-video 4 continues to be played, the position of each image is adjusted in the image display area 102, so that the image 2, the image 3 and the image 4 that is corresponding to the target sub-video 4 are displayed in the image display area; as shown in FIG. 8 (c), when the target sub-video 4 finishes playing and the target sub-video 1 continues to be played, the position of each image is adjusted in the image display area 102, so that the images 3, 4 and 1 are displayed in the image display area 102. By analogy, the terminal device can circularly play the target sub-videos and circularly display the corresponding images in the image display area.

In addition, another window sliding mode may include: when one target sub-video finishes playing and the next target sub-video is to be played, the window length occupied by one image in the image display area is taken as the sliding step length, and the first image currently displayed in the image display area is moved out of the image display area, and meanwhile other images are moved sequentially, and at this time, the first image displayed in the image display area is the image corresponding to the currently played target sub-video; by analogy, the terminal device can circularly play the target sub-videos and circularly display the corresponding images in the image display area.

Figure 9:
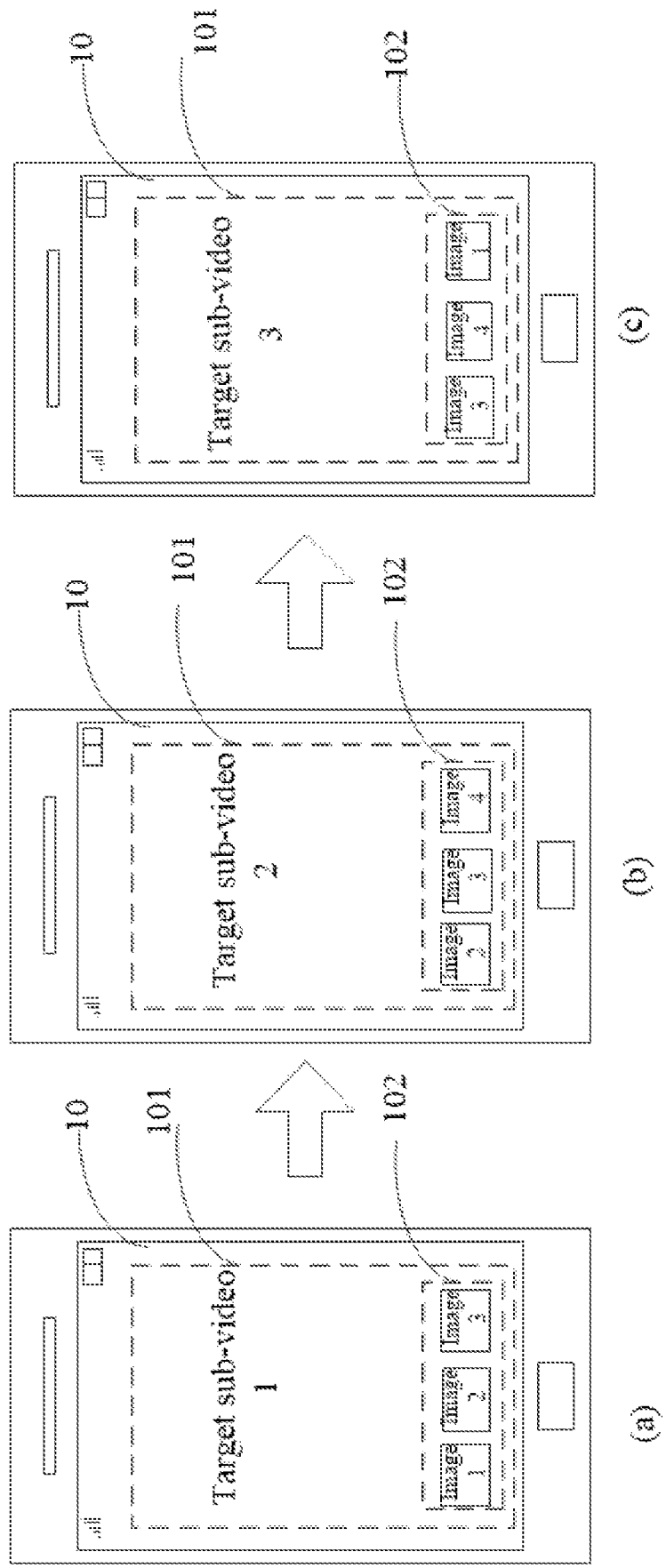
FIG. 9 is a schematic diagram of a scenario of a display method provided by another embodiment of the present disclosure.

Exemplarily, the target videos include four target sub-videos (target sub-video 1, target sub-video 2, target sub-video 3 and target sub-video 4), and the multiple images include four images (image 1, image 2, image 3 and image 4), and three images can be simultaneously displayed in the image display area. As shown in FIG. 9(a), when the user interface is turned on and the target sub-video 1 is played, the image 1 corresponding to the target sub-video 1, the image 2 corresponding to the target sub-video 2 and the image 3 corresponding to the target sub-video 3 are displayed in the image display area. As shown in FIG. 9(b), when the target sub-video 1 finishes playing and the target sub-video 2 continue to be played, the position of each image is adjusted in the image display area, so that the image 2, the image 3 and the image 4 that is corresponding to the target sub-video 4 are displayed in the image display area; as shown in FIG. 9(c), when the target sub-video 2 finishes playing and the target sub-video 3 continues to be played, the position of each image is adjusted in the image display area, so that the images 3, 4 and 1 are displayed in the image display area; by analogy, the terminal device can circularly play the target sub-videos and circularly display the corresponding images in the image display area.

Figure 10:
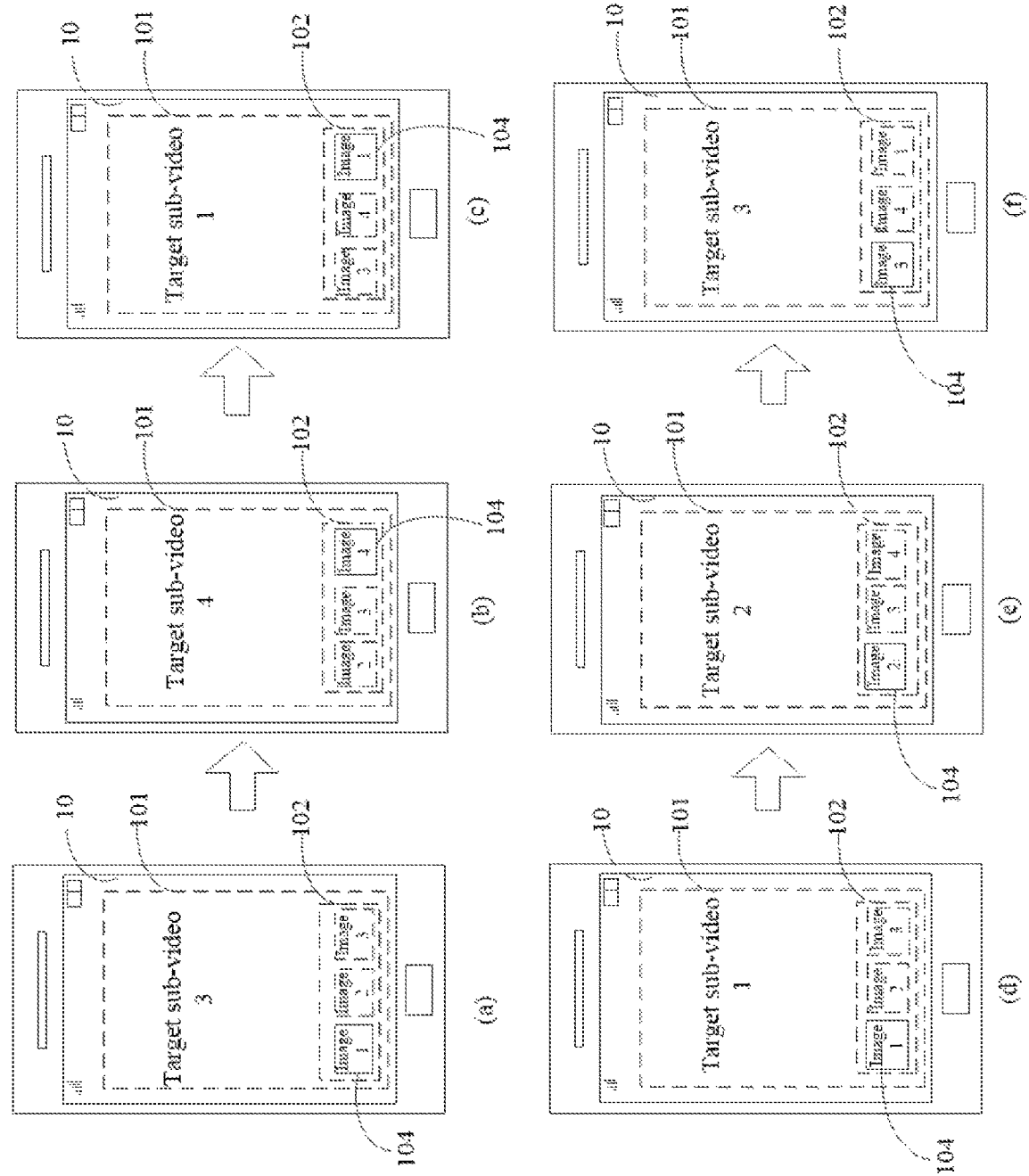
FIG. 10 is a schematic diagram of a scenario of a display method provided by another embodiment of the present disclosure.

Scenario 3. While highlighting the image corresponding to the currently played target sub-video in the image display area, adjusting the display position of the image in the image display area according to the current playing progress, that is, the combination of the above-mentioned scenario 1 and scenario 2. As shown in FIG. 10, for the specific implementation method, please refer to the description of scenarios 1 and 2, which will not be repeated here.

Where it is also possible to combine with the above-mentioned display identifier in scenario 1 on the basis of FIG. 2 to highlight the image 3 corresponding to the currently played target sub-video 3; in addition, it is also possible to combine with the above-mentioned scenario 2 to adjust the display state of the images in the image display area when jumping and displaying; and in addition, it is also possible to combine with the above-mentioned scenario 3 to realize the jumping and displaying, and so on, the specific implementation methods can be combined with the above-mentioned scenarios 1, 2 and 3, and will not be repeated here.

In one embodiment, since the number of images that can be displayed simultaneously in the image display area is limited, when the user wants to view the image that is not currently displayed in the image display area and the corresponding target sub-video, the synchronous display of the image and the corresponding target sub-video can be realized on the user interface through a triggering operation acting on the image display area, such as a sliding operation, so that more images and sub-videos can be viewed, thereby meeting the user's personalized viewing or searching requirements.

Exemplarily, on basis of FIG. 1, in order to facilitate the user to view any image in the image display area, a sliding area 105 may be provided in the image display area (the position of the sliding area in the image display area is not specifically limited, or the sliding area may not be provided, but instead, sliding on any position of the image display area). Specifically, it can be realized by the following ways:

detecting a sliding operation on the image display area; and sequentially displaying the multiple target sub-videos in the target videos on the user interface according to the speed of the sliding operation.

Figure 11:
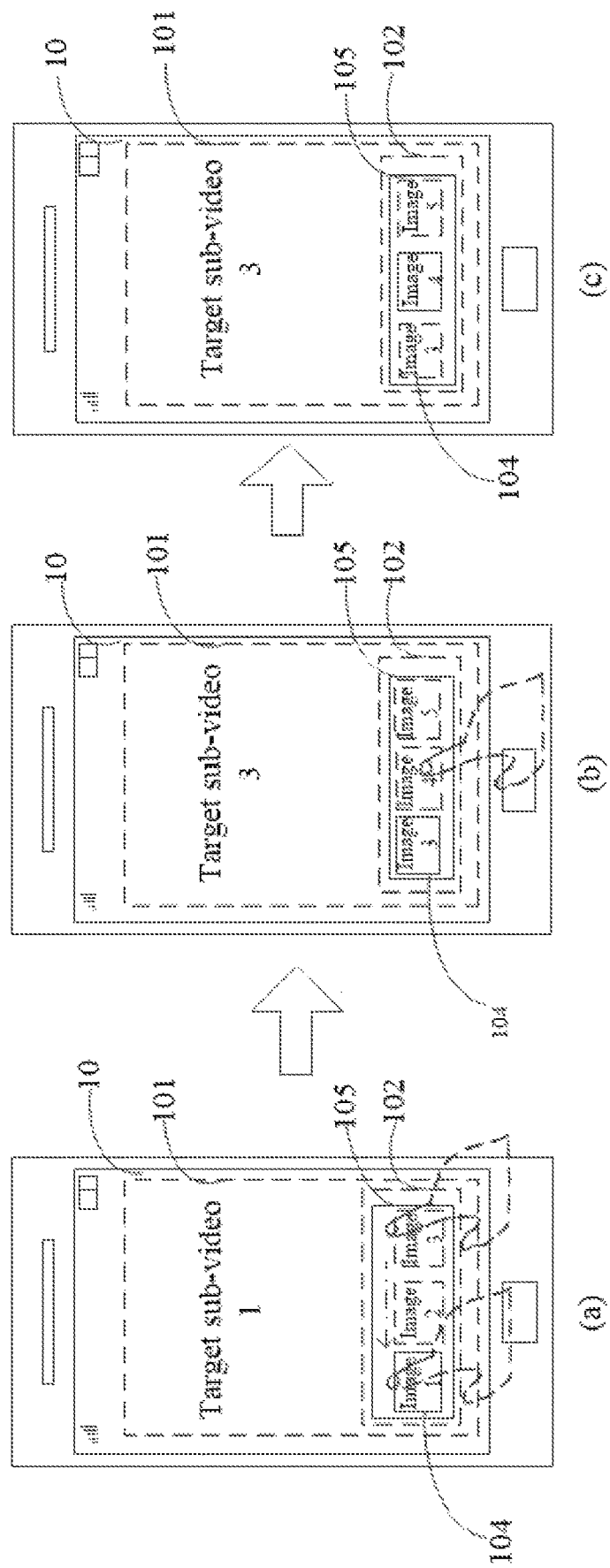
FIG. 11 is a schematic diagram of a scenario of a display method provided by another embodiment of the present disclosure.

Combined with the example of scenario 2, and taking the sliding area 105 as an example, please refer to FIG. 11. As shown in FIG. 11(a), the target sub-video 1 is currently being played on the user interface, and the user performs sliding leftwards operation and releasing operation on the image display area 102 so that the image 3 is released and displayed in the image display area 102, and the terminal device jumps to and plays the target sub-video 3 on the user interface 102, and meanwhile the images displayed in the image display area are adjusted. As shown in FIG. 11(b), the terminal device displays the image 3 on the leftmost of the image display area 102 and meanwhile plays the target sub-video 3 in the user interface 101. When the user wants to view or watch the target sub-video 4 corresponding to the image 4, similarly, the user interface jumps to and plays the target sub-video 4 through the triggering operation acting on the image 4, as shown in FIG. 11(c), which provides convenient operation for users, so that users can watch arbitrary image and corresponding target sub-video at any time.

Therefore, the present disclosure can realize the ability of displaying multiple related videos in a single video aggregation, and meanwhile realize the linkage with the images associated with the videos, thereby enhancing the attractiveness of video content. In addition, the target videos recommended to the users in the present disclosure can meet the personalized needs of the users, and provide convenient operation for the users, so that the users can quickly and effectively obtain the required information, realize multi-functional and rich viewing experience, and improve the user's operation experience.

Figure 12:
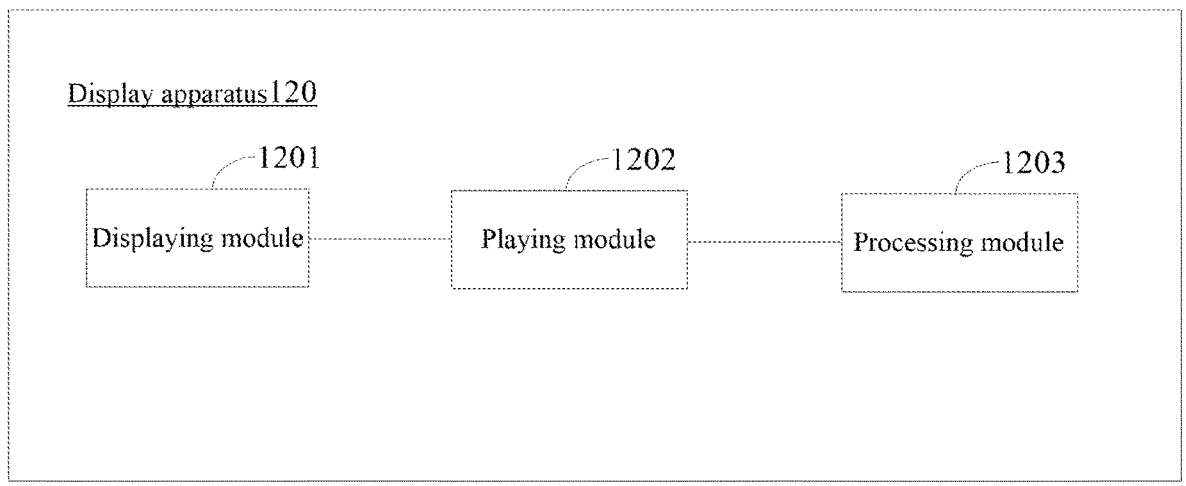
FIG. 12 is a structural block diagram of a display apparatus according to an embodiment of the present disclosure.

FIG. 12 is a structural block diagram of a display apparatus provided by an embodiment of the present disclosure, corresponding to the display method of the embodiments disclosed above. Where the display apparatus can be a terminal device. For convenience of explanation, only the parts related to the embodiment of the present disclosure are shown. Referring to FIG. 12, the display apparatus 120 may include a displaying module 1201, a playing module 1202 and a processing module 1203. The displaying module 1201 is configured to display a user interface for playing a target video, where the user interface includes an image display area, and the target video includes multiple target sub-videos; the playing module 1202 is configured to display multiple images in the image display area and meanwhile play each target sub-video in the target video sequentially on the user interface, where the multiple target sub-videos respectively correspond to the multiple images displayed in the image display area; the processing module 1203 is configured to, in response to a first triggering operation acting on a target image in the image display area, jump to and display target information associated with the target image, where the target image includes any image displayed in the image display area.

The displaying module 1201, the playing module 1202 and the processing module 1203 provided by the embodiment of the present disclosure can display a user interface for playing a target video, the target video includes multiple target sub-videos, where the user interface includes an image display area, and sequentially play each target sub-video in the target video while displaying multiple images, which provides users with the convenience of viewing multiple target sub-videos and multiple images on the same user interface. Since the multiple target sub-videos correspond to the multiple images displayed in the image display area, respectively, the users can view the displayed images and meanwhile watch the target sub-videos corresponding to the displayed images, and also the displaying of the images can produce linkage effect with the playing of the target sub-videos to clearly show to the users which target image corresponds to the target sub-video that is being played, so that the users can have a better viewing experience; in addition, if there is a first triggering operation acting on any image displayed in the image display area, that is, acting on the target image, then in respond to the first triggering operation, the target information associated with the target image can be displayed by jumping, and the information associated with the target image can be easily obtained, thereby allowing the users to get more information on the target images or the content associated with the target images, without need for users to perform tedious operations such as searching for the target images and screening out the content associated with the target images, and with only need to perform the first triggering operation on the target images to jump to and display the target information associated with the target images, which simplifies the operation steps, and thus improves the user experience.

The apparatus provided by the embodiments of the present disclosure can be used to implement the technical solution of any of the embodiments of the display method described in the first aspect above, and its implementation principle and technical effect are similar to the method, and will not be repeated in the present embodiment of the present disclosure.

In an embodiment of the present disclosure, the playing module is described in detail on the basis of the above embodiment of the present disclosure. Where the target video is formed by splicing the multiple target sub-videos, and the playing module 1202 is specifically configured to obtain a playing order and a playing duration of each target sub-video in the target video; and play each target sub-video in the target video on the user interface, according to the playing order and playing duration.

In an embodiment of the present disclosure, the playing module 1202 is further specifically configured to execute the following steps sequentially on each target sub-video: obtaining a playing address of a corresponding target sub-video; and obtaining a corresponding target sub-video according to the playing address obtained, and obtaining a playing address of a next target sub-video while playing the corresponding target sub-video on the user interface.

In an embodiment of the present disclosure, the processing module 1203 is specifically configured to, in response to the first triggering operation, jump to and display static target information or dynamic target information associated with the target image.

In an embodiment of the present disclosure, the processing module 1203 is further configured to, when jumping to a target interface and displaying the target information associated with the target image, pause a first target sub-video currently being played on the user interface in response to the first triggering operation; and record a pause time when the first target sub-video is paused.

In one embodiment of the present disclosure, based on the above-mentioned embodiments, the present embodiment of the present disclosure describes the displaying module in detail. The displaying module is further configured to, in response to a second triggering operation acting on the target interface, restore the displaying of the user interface; and starting from the pause time, play the first target sub-video continuously on the user interface, and display the multiple images in the image display area.

In an embodiment of the present disclosure, the playing module is further configured to: when the pause time is a time when the first target sub-video finishes playing, play continuously a next target sub-video following the first target sub-video on the user interface, and display the multiple images in the image display area.

In an embodiment of the present disclosure, the playing module is further configured to: after jumping to and displaying the target interface, play the target video continuously; in response to a third triggering operation acting on the target interface, jump to and display the user interface and play the target video continuously on the user interface.

In an embodiment of the present disclosure, the image display area includes a sliding area, and the processing module is further configured to: detect a sliding operation on the image display area; and display the multiple target sub-videos in the target videos sequentially on the user interface, according to a speed of the sliding operation.

On the basis of the above-mentioned embodiments of the present disclosure, the embodiment of the present disclosure explains the apparatus in detail. The apparatus may further include a generating module; the generating module is configured to receive the multiple target sub-videos; receive the multiple images, where the multiple images correspond to the multiple target sub-videos, respectively; according to the multiple target sub-videos and the multiple images, play the target sub-videos sequentially while displaying the multiple images on the user interface.

The above modules can be implemented as software components executable on one or more general-purpose processors, or as hardware for performing certain functions or their combinations, such as programmable logic devices and/or application-specific integrated circuits. In some embodiments, these modules can be embodied in the form of software products, which can be stored in non-volatile storage medium, including those that enable a computer device (such as personal computer, server, network device, mobile terminal, etc.) to implement the methods described in the embodiments of the present disclosure. In one embodiment, the above modules can also be implemented on a single device or distributed on multiple devices. The functions of these modules can be combined with each other or further split into multiple sub-modules.

Those skilled in the art can clearly understand that for the convenience and conciseness of the description, the specific working process of the module of the display apparatus described above can refer to the corresponding process in the aforementioned method embodiments, and will not be repeated here.

Based on the same inventive concept as the method, the embodiments of the present application also provide an electronic device including a processor and a memory;
the memory is configured to store programs for executing the methods of the above-mentioned various method embodiments; and the processor is configured to execute the programs stored in the memory.

Figure 13:
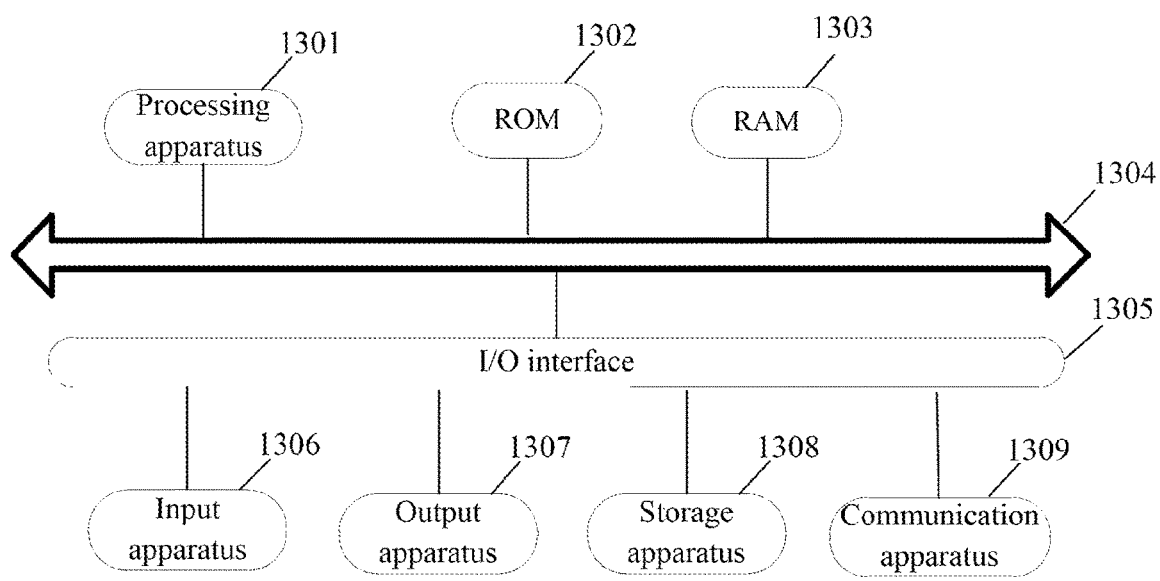
FIG. 13 is a schematic diagram of a hardware structure of an electronic device according to an embodiment of the present disclosure.

Referring to FIG. 13, it shows a schematic structural diagram of an electronic device suitable for implementing the embodiments of the present disclosure, and the electronic device may be a terminal device or a server. The electronic device includes a processor and a memory; the memory is configured to store programs for executing the methods of the above-mentioned various method embodiments; and the processor is configured to execute the programs stored in the memory. The processor may be a processing unit including a Central Processing Unit (CPU) or other forms with data processing capability and/or instruction execution capability, and may control other components in the electronic device to perform desired functions. The memory may include one or more computer program products, which may include various forms of computer readable storage medium, such as volatile memory and/or nonvolatile memory. The volatile memory may include, for example, a random access memory (RAM) and/or a cache memory (cache). The nonvolatile memory may include, for example, read only memory (ROM), hard disk, flash memory, etc. One or more computer program instructions may be stored on the computer readable storage medium, and the processor may run the program instructions to realize the functions of the above-mentioned embodiments of the present disclosure and/or other desired functions.

The terminal device may include, but is not limited to, a mobile terminal, such as a mobile phone, a notebook computer, a digital broadcast receiver, a Personal Digital Assistant (PDA), a Portable Android Device (PAD), a Portable Medium Player (PMP), a vehicle-mounted terminal (e.g., vehicle navigation terminal, wearable electronic device), etc.; and a fixed terminal, such as a digital Television (TV), a desktop computer, etc. The electronic device shown in FIG. 13 is only an example, and should not bring any limitation to the functions and application scope of the embodiments of the present disclosure.

As shown in FIG. 13, the electronic device may include a processing apparatus 1301 (e.g., CPU, graphics processor, etc.), which may execute various appropriate actions and processes according to a program stored in a read only memory (ROM) 1302 or a program loaded from a storage apparatus 1308 into a random access memory (RAM) 1303. In the RAM 1303, various programs and data necessary for the operation of the electronic device are also stored. The processing apparatus 1301, the ROM 1302 and the RAM 1303 are connected to each other through a bus 1304. An input/output (I/O) interface 1305 is also connected to the bus 1304.

Generally, the following apparatus can be connected to the I/O interface 1305: an input apparatus 1306 including, for example, a touch screen, a touch pad, a keyboard, a mouse, a camera, a microphone, an accelerometer, a gyroscope, etc.; an output apparatus 1307 including, for example, a liquid crystal display (LCD), a speaker, a vibrator, etc.; a storage apparatus 1308 including, for example, a magnetic tape, a hard disk, etc.; and a communication apparatus 1309. The communication apparatus 1309 may allow the electronic device to carry out wireless or wired communication with other device so as to exchange data. Although FIG. 13 shows an electronic device having various apparatuses, it should be understood that not all of the illustrated apparatuses are required to be implemented or equipped. Alternatively, more or less devices may be implemented or equipped.

In particular, according to embodiments of the present disclosure, the processes described above with reference to the flowcharts may be implemented as a computer software program. For example, an embodiment of the present disclosure includes a computer program product, including a computer program carried on a computer-readable medium, and the computer program includes program codes for executing the methods shown in the flowchart. In such an embodiment, the computer program may be downloaded from the network via the communication apparatus 1309 and installed, or may be installed from the storage apparatus 1308, or installed from the ROM 1302. When the computer program is executed by the processing apparatus 1301, the above-mentioned functions defined in the methods of the embodiments of the present disclosure are executed.

It should be noted that the computer-readable medium mentioned above in the present disclosure may be a computer-readable signal medium or a computer-readable storage medium, or any combination of the above two. The computer readable storage medium can be, for example, but is not limited to, an electrical, magnetic, optical, electromagnetic, infrared, or semiconductor system, apparatus or device, or any combination of the above. More specific examples of the computer readable storage medium may include, but are not limited to, an electrical connection with one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the above. In the present disclosure, a computer-readable storage medium may be any tangible medium that contains or stores a program, the program can be used by or in conjunction with an instruction execution system, apparatus, or device. And in the present disclosure, a computer-readable signal medium may include a data signal propagated in baseband or as part of a carrier wave, and carries computer-readable program codes. Such propagated data signals may take a variety of forms, including but not limited to an electromagnetic signal, an optical signal, or any suitable combination of the above. The computer-readable signal medium can also be any computer-readable medium other than a computer-readable storage medium and can transmit, propagate, or transport the program for use by or in conjunction with the instruction execution system, apparatus, or device. The program codes included on the computer readable medium may be transmitted using any suitable medium including, but not limited to, electrical wire, optical cable, radio frequency (RF), etc., or any suitable combination of the above.

The above-mentioned computer-readable medium may be included in the above-mentioned electronic device; it may also exist individually without being assembled into the electronic device.

The above-mentioned computer-readable medium carries one or more programs, and when the above-mentioned one or more programs are executed by the electronic device, the electronic device is caused to execute the methods shown in the above embodiments.

The computer program codes for carrying out operations of the present disclosure may be written in one or more programming languages or combination thereof, including object-oriented programming languages, such as Java, Smalltalk, C++, and conventional procedural programming languages, such as the "C" language or similar programming language. The program codes may be executed entirely on the user's computer, partly on the user's computer, as a stand-alone software package, both partly on the user's computer and partly on a remote computer, or entirely on a remote computer or a server. In the case of the remote computer, the remote computer can be connected to the user's computer through any kind of network, including a Local Area Network (LAN) or Wide Area Network (WAN), or it can be connected to an external computer (e.g., connected via the internet through an internet service provider).

The flowcharts and block diagrams in the accompanying drawings illustrate the architecture, functionality, and operation of possible implementations of systems, methods and computer program products according to various embodiments of the present disclosure. In this regard, each block in the flowcharts or block diagrams may represent part of a module, a program segment, or a code, and the part of the module, the program segment, or the code contains one or more executable instructions for implementing a specified logical function. It should also be noted that, in some alternative implementations, the functions indicated in the blocks may occur out of the order noted in the figures. For example, two blocks shown in succession may, in fact, be executed substantially concurrently, or may sometimes be executed in a reverse order, depending upon the function involved. It is also noted that each block of the block diagrams and/or flowchart diagrams, and combinations of blocks in the block diagrams and/or flowchart diagrams, can be implemented by a dedicated hardware-based system for performing a specified function or operation, or can be implemented using a combination of dedicated hardware and computer instructions.

The units involved in the embodiments of the present disclosure may be implemented in a software manner, and may also be implemented in a hardware manner. Where the name of the unit does not constitute a limitation of the unit itself under certain circumstances. For example, a first obtaining unit may also be described as "a unit for obtaining at least two internet protocol addresses".

The functions described herein above may be performed, at least in part, by one or more hardware logic components. For example, without limitation, exemplary types of the hardware logic components that may be used include: field-programmable gate array (FPGA), application specific integrated circuit (ASIC), application specific standard products (ASSP), system on chip (SOC), complex programmable logical device (CPLD), etc.

In the context of the present disclosure, a machine-readable medium may be a tangible medium and may contain or store a program for use by or in conjunction with the instruction execution system, apparatus or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above.

In a first aspect, an embodiment of the present disclosure provides a display method, including:
　　displaying a user interface for playing a target video, where the user interface includes an image display area, and the target video includes multiple target sub-videos;
　　playing each target sub-video in the target video sequentially on the user interface while displaying multiple images in the image display area, where the multiple target sub-videos respectively correspond to the multiple images displayed in the image display area; and
　　in response to a first triggering operation acting on a target image in the image display area, jumping to and displaying target information associated with the target image, the target image includes any image displayed in the image display area.

According to one or more embodiments of the present disclosure, the target video is formed by splicing the multiple target sub-videos, and playing each target sub-video in the target video sequentially on the user interface includes:
　　obtaining a playing order and a playing duration of each target sub-video in the target video; and
　　playing each target sub-video in the target video on the user interface, according to the playing order and playing duration.

According to one or more embodiments of the present disclosure, playing each target sub-video in the target video sequentially on the user interface includes:
　　executing the following steps sequentially on each target sub-video:
　　obtaining a playing address of a corresponding target sub-video; and
　　obtaining the corresponding target sub-video according to the playing address obtained, and obtaining a playing address of a next target sub-video while playing the corresponding target sub-video on the user interface.

According to one or more embodiments of the present disclosure, jumping to and displaying the target information associated with the target image in response to the first triggering operation acting on the target image in the image display area, includes:
　　in response to the first triggering operation, jumping to and displaying static target information or dynamic target information associated with the target image.

According to one or more embodiments of the present disclosure, when the interface for jumping to and displaying the target information associated with the target image is the target interface, the method further includes:
　　in response to the first triggering operation, pausing the first target sub-video currently being played on the user interface; and
　　recording a pause time when the first target sub-video is paused.

According to one or more embodiments of the present disclosure, the method further includes:
　　in response to a second triggering operation acting on the target interface, restoring the displaying of the user interface; and
　　starting from the pause time, playing the first target sub-video continuously on the user interface, and displaying the multiple images in the image display area.

According to one or more embodiments of the present disclosure, the method further includes:
　　when the pause time is a moment when the first target sub-video finishes playing, playing a next target sub-video following the first target sub-video continuously on the user interface, and displaying the multiple images in the image display area.

According to one or more embodiments of the present disclosure, the method further includes:
　　after jumping to and displaying the target interface, playing the target video continuously; and
　　in response to a third triggering operation acting on the target interface, jumping to and displaying the user interface and playing the target video continuously on the user interface.

According to one or more embodiments of the present disclosure, the image display area includes a sliding area, and the method includes:
　　detecting a sliding operation on the image display area; and
　　displaying the multiple target sub-videos in the target video sequentially on the user interface, according to a speed of the sliding operation.

According to one or more embodiments of the present disclosure, the method further includes:
　　receiving the multiple target sub-videos;

receiving the multiple images, where the multiple images correspond to the multiple target sub-videos, respectively; and according to the multiple target sub-videos and the multiple images, playing the multiple target sub-videos sequentially while displaying the multiple images on the user interface.

In a second aspect, an embodiment of the present disclosure provides a display apparatus, including:

a displaying module, configured to display a user interface for playing a target video, where the user interface includes an image display area, and the target video comprises multiple target sub-videos;

a playing module, configured to play each target sub-video in the target video sequentially on the user interface while displaying multiple images in the image display area, where the multiple target sub-videos respectively correspond to the multiple images displayed in the image display area; and a processing module, configured to, in response to a first triggering operation acting on a target image in the image display area, jump to and display target information associated with the target image, where the target image includes any image displayed in the image display area.

According to one or more embodiments of the present disclosure, where the target video is formed by splicing the multiple target sub-videos, and the playing module is specifically configured to: obtain a playing order and a playing duration of each target sub-video in the target video; play each target sub-video in the target video on the user interface, according to the playing order and playing duration.

According to one or more embodiments of the present disclosure, the playing module is specifically configured to execute the following operations sequentially on each target sub-video: obtaining a playing address of a corresponding target sub-video; obtaining the corresponding target sub-video according to the playing address obtained, and obtaining a playing address of a next target sub-video while playing the corresponding target sub-video on the user interface.

According to one or more embodiments of the present disclosure, the processing module is specifically configured to: in response to the first triggering operation, jump to and display static target information or dynamic target information associated with the target image.

According to one or more embodiments of the present disclosure, the processing module is further configured to: when an interface for jumping to and displaying the target information associated with the target image is the target interface, in response to the first triggering operation, pause a first target sub-video currently being played on the user interface; and record a pause time when the first target sub-video is paused.

According to one or more embodiments of the present disclosure, the displaying module is further configured to: in response to a second triggering operation acting on the target interface, restore the displaying of the user interface; and starting from the pause time, play the first target sub-video continuously on the user interface, and display the multiple images in the image display area.

According to one or more embodiments of the present disclosure, the playing module is further configured to: when the pause time is a time when the first target sub-video finishes playing, play continuously a next target sub-video following the first target sub-video on the user interface, and display the multiple images in the image display area.

According to one or more embodiments of the present disclosure, the playing module is further configured to: after jumping to and displaying the target interface, play the target video continuously; and in response to a third triggering operation acting on the target interface, jump to and display the user interface and play the target video continuously on the user interface.

According to one or more embodiments of the present disclosure, the image display area includes a sliding area, and the processing module is further configured to: detect a sliding operation on the image display area; and display the multiple target sub-videos in the target video sequentially on the user interface, according to a speed of the sliding operation.

According to one or more embodiments of the present disclosure, the apparatus may further include a generating module configured to: receive the multiple target sub-videos; receive the multiple images, where the multiple images correspond to the multiple target sub-videos, respectively; and according to the multiple target sub-videos and the multiple images, play the multiple target sub-videos sequentially while displaying the multiple images on the user interface.

In a third aspect, an embodiment of the present disclosure provides an electronic device, including: at least one processor and a memory;

the memory stores computer-executable instructions;

the at least one processor executes the computer-executable instructions stored in the memory, so that the at least one processor executes the display method according to any one of the first aspect.

In a fourth aspect, an embodiment of the present disclosure provides a computer-readable storage medium, the computer-readable storage medium stores computer-executable instructions which, when executed by a processor, implement the display method according to any one of the first aspect.

In a fifth aspect, an embodiment of the present disclosure provides a computer program product including a computer program which, when executed by a processing apparatus, implements steps of the method according to any one of the embodiments in the present disclosure.

In a sixth aspect, an embodiment of the present disclosure provides a computer program that, when executed by a processing apparatus, implements steps of the method according to any one of the embodiments in the present disclosure.

The above descriptions are merely for preferred embodiments of the present disclosure and also are illustrations of the technical principles employed. Those skilled in the art should understand that the scope of disclosure involved in the present disclosure is not limited to the technical solutions formed by specific combinations of the above-mentioned technical features, and should cover, without departing from the above-mentioned disclosed concept, other technical solutions formed by any combination of the above-mentioned technical features or equivalent features thereof. For example, a technical solution is formed by replacing the above features with the technical features having similar functions disclosed in the present disclosure (but not limited to those).

Additionally, although operations are depicted in a particular order, this should not be construed as requiring that the operations are performed in the particular order shown or in a sequential order. Under certain circumstances, multitasking and parallel processing may be advantageous. Likewise, although the above description contains several specific implementation details, these should not be construed as limitations on the scope of the present disclosure. Certain features described in the context of separate embodiments can also be implemented in combination in a single embodiment. Conversely, various features described in the context of a single embodiment can also be implemented in multiple embodiments separately or in any suitable subcombination.

Although the subject matter has been described by language specific to structural features and/or method logical actions, it should be understood that the subject matter defined in the appended claims is not necessarily limited to specific features or actions described above. Rather, the specific features and actions described above are merely examples for implementing the claims.

What is claimed is:

1. A display method, comprising:
  displaying a user interface for playing a target video, wherein the user interface comprises an image display area, and the target video comprises multiple target sub-videos;
  playing each target sub-video in the target video sequentially on the user interface while displaying multiple images in the image display area concurrently, wherein the multiple target sub-videos respectively correspond to the multiple images displayed in the image display area; and
  in response to a first triggering operation from the user acting on a target image in the image display area, jumping to and displaying target information associated with the target image, wherein the target image comprises any image displayed in the image display area;
  wherein, in response to the first triggering operation acting on the target image in the image display area, jumping to and displaying the target information associated with the target image further comprises:
    in response to the first triggering operation from the user acting on any one of the multiple images displayed in the image display area, jumping to and displaying static target information or dynamic target information associated with the target image; and
  wherein before the playing each target sub-video in the target video sequentially on the user interface while displaying multiple images in the image display area concurrently, the method further comprises:
    receiving the multiple target sub-videos and the multiple images, and establishing a correspondence relationship between the multiple target sub-videos and the multiple images.

2. The method according to claim 1, wherein the target video is formed by splicing the multiple target sub-videos, and the playing each target sub-video in the target video sequentially on the user interface comprises:
  obtaining a playing order and a playing duration of each target sub-video in the target video;
  playing each target sub-video in the target video on the user interface, according to the playing order and playing duration.

3. The method according to claim 1, wherein the playing each target sub-video in the target video sequentially on the user interface comprises:
  executing the following operations sequentially on each target sub-video:
    obtaining a playing address of a corresponding target sub-video; and
    obtaining the corresponding target sub-video according to the playing address obtained, and obtaining a playing address of a next target sub-video while playing the corresponding target sub-video on the user interface.

4. The method according to claim 1, wherein, when jumping to a target interface and displaying the target information associated with the target image, the method further comprises:
  in response to the first triggering operation, pausing a first target sub-video currently being played on the user interface; and
  recording a pause time when the first target sub-video is paused.

5. The method according to claim 4, wherein the method further comprises:
  in response to a second triggering operation acting on the target interface, restoring displaying of the user interface; and
  starting from the pause time, playing the first target sub-video continuously on the user interface, and displaying the multiple images in the image display area.

6. The method according to claim 5, wherein the method further comprises:
  when the pause time is a time when the first target sub-video finishes playing, playing a next target sub-video following the first target sub-video continuously on the user interface, and displaying the multiple images in the image display area.

7. The method according to claim 4, wherein the method further comprises:
  after jumping to and displaying the target interface, playing the target video continuously; and
  in response to a third triggering operation acting on the target interface, jumping to and displaying the user interface and playing the target video continuously on the user interface.

8. The method according to claim 1, wherein the image display area comprises a sliding area, and the method comprises:
  detecting a sliding operation on the image display area; and
  displaying the multiple target sub-videos in the target video sequentially on the user interface, according to a speed of the sliding operation.

9. A display apparatus, comprising at least one processor and a memory, the memory stores computer executable instructions;
  the at least one processor executes the computer executable instructions stored in the memory, so that the at least one processor is enabled to:
  display a user interface for playing a target video, wherein the user interface comprises an image display area, and the target video comprises multiple target sub-videos;
  play each target sub-video in the target video sequentially on the user interface while displaying multiple images in the image display area concurrently, wherein the multiple target sub-videos respectively correspond to the multiple images displayed in the image display area; and
  in response to a first triggering operation from the user acting on a target image in the image display area, jump to and display target information associated with the target image, wherein the target image comprises any image displayed in the image display area;
  wherein the at least one processor is further enabled to:
    in response to the first triggering operation from the user acting on any one of the multiple images displayed in the image display area, jump to and display static target information or dynamic target information associated with the target image; and wherein before the playing each target sub-video in the target video sequentially on the user interface while displaying multiple images in the image display area concurrently, the at least one processor is further enabled to:

receive the multiple target sub-videos and the multiple images, and establish a correspondence relationship between the multiple target sub-videos and the multiple images.

10. The display apparatus according to claim 9, wherein the at least one processor is further enabled to:

obtain a playing order and a playing duration of each target sub-video in the target video; and play each target sub-video in the target video on the user interface, according to the playing order and playing duration.

11. The display apparatus according to claim 9, wherein the at least one processor is further enabled to:

execute the following operations sequentially on each target sub-video:

obtaining a playing address of a corresponding target sub-video; and obtaining the corresponding target sub-video according to the playing address obtained, and obtaining a playing address of a next target sub-video while playing the corresponding target sub-video on the user interface.

12. The display apparatus according to claim 9, wherein the at least one processor is further enabled to, when jumping to a target interface and displaying the target information associated with the target image, in response to the first triggering operation, pause a first target sub-video currently being played on the user interface; and record a pause time when the first target sub-video is paused.

13. The display apparatus according to claim 12, wherein the at least one processor is further enabled to:

in response to a second triggering operation acting on the target interface, restore displaying of the user interface; and starting from the pause time, play the first target sub-video continuously on the user interface, and display the multiple images in the image display area.

14. The display apparatus according to claim 13, wherein the at least one processor is further enabled to:

when the pause time is a time when the first target sub-video finishes playing, play a next target sub-video following the first target sub-video continuously on the user interface, and display the multiple images in the image display area.

15. The display apparatus according to claim 12, wherein the at least one processor is further enabled to:

after jumping to and displaying the target interface, play the target video continuously; and in response to a third triggering operation acting on the target interface, jump to and display the user interface and play the target video continuously on the user interface.

16. The display apparatus according to claim 9, wherein the image display area comprises a sliding area, and the at least one processor is further enabled to:

detect a sliding operation on the image display area; and display the multiple target sub-videos in the target video sequentially on the user interface, according to a speed of the sliding operation.

17. A non-transitory computer readable storage medium, wherein the computer readable storage medium stores computer-executable instructions which, when executed by a processor, are enabled to:

display a user interface for playing a target video, wherein the user interface comprises an image display area, and the target video comprises multiple target sub-videos;

play each target sub-video in the target video sequentially on the user interface while displaying multiple images in the image display area concurrently, wherein the multiple target sub-videos respectively correspond to the multiple images displayed in the image display area; and in response to a first triggering operation from the user acting on a target image in the image display area, jump to and display target information associated with the target image, wherein the target image comprises any image displayed in the image display area;

wherein the computer-executable instructions are further enabled to:

in response to the first triggering operation from the user acting on any one of the multiple images displayed in the image display area, jump to and display static target information or dynamic target information associated with the target image; and wherein before the playing each target sub-video in the target video sequentially on the user interface while displaying multiple images in the image display area concurrently, the computer-executable instructions are further enabled to:

receive the multiple target sub-videos and the multiple images, and establish a correspondence relationship between the multiple target sub-videos and the multiple images.

* * * * *